US012749608B2

(12) United States Patent
Amano et al.

(10) Patent No.: US 12,749,608 B2
(45) Date of Patent: Sep. 29, 2026

(54) NANOGRANULAR MAGNETIC FILM AND ELECTRONIC COMPONENT

(71) Applicant: TDK Corporation, Tokyo (JP)

(72) Inventors: Hajime Amano, Tokyo (JP); Kensuke Ara, Tokyo (JP); Kazuhiro Yoshidome, Tokyo (JP)

(73) Assignee: TDK CORPORATION, Tokyo (JP)

( * ) Notice: Subject to any disclaimer, the term of this patent is extended or adjusted under 35 U.S.C. 154(b) by 172 days.

(21) Appl. No.: 18/901,060

(22) Filed: Sep. 30, 2024

(65) Prior Publication Data

US 2025/0111976 A1 Apr. 3, 2025

(30) Foreign Application Priority Data

Sep. 29, 2023 (JP) ................................ 2023-169998
Jul. 31, 2024 (JP) ................................ 2024-124912

(51) Int. Cl.
*H01F 10/13* (2006.01)

(52) U.S. Cl.
CPC ................................ *H01F 10/132* (2013.01)

(58) Field of Classification Search
None
See application file for complete search history.

(56) References Cited

U.S. PATENT DOCUMENTS 4,623,408 A 11/1986 Karamon et al.

FOREIGN PATENT DOCUMENTS

| | | | | |
|---|---|---|---|---|
| CN | 105448450 A | * | 3/2016 | ........... H01F 1/0063 |
| JP | S60-152651 A | | 8/1985 | |
| WO | 2023-127199 A1 | | 7/2023 | |

OTHER PUBLICATIONS

Suenaga, CN-105448450-A, Mar. 30, 2016 (machine translation) (Year: 2016).*

* cited by examiner

*Primary Examiner* — Cheng Yuan Huang
(74) *Attorney, Agent, or Firm* — Oliff PLC

(57) ABSTRACT

A nanogranular magnetic film includes first phases comprised of nano-domains dispersed in a second phase. The first phases include Fe and Co. The second phase includes at least one selected from the group consisting of O, N, and F. A CV of Fe/(Fe+Co) of grids is 0.150 or more and 0.500 or less, provided that a measurement range is determined in the nanogranular magnetic film, the measurement range is divided with the grids including at least 80,000 grids each measuring 1 nm×1 nm×1 nm, and Fe/(Fe+Co) of each of the grids is measured in atomic ratio.

4 Claims, 4 Drawing Sheets

NANOGRANULAR MAGNETIC FILM AND ELECTRONIC COMPONENT

TECHNICAL FIELD

The present invention relates to a nanogranular magnetic film and an electronic component.

BACKGROUND

Recent mobile devices, such as smartphones and smartwatches, have been required to have a larger display, a larger battery capacity, a smaller size, and less weight at the same time. The requirements of having a larger display and a larger battery capacity are inconsistent with the requirements of having a smaller size and less weight. To achieve these inconsistent requirements, a circuit board has been required to have a smaller size.

A power supply circuit, which occupies a particularly large area in the circuit board, has been required to have a smaller size. Further, an inductor, which occupies a particularly large mounting area in the power supply circuit, has been required to have a smaller size.

To reduce the size of the inductor, increasing operating frequencies of the power supply circuit is particularly effective. To increase the operating frequencies of the power supply circuit, a switching element operable at high operating frequencies is required.

Because a conventional switching element for a power supply circuit has been made from silicon, the power supply circuit has been having operating frequency constraints, which have been imposed by physical property limits of silicon. However, in recent years, a semiconductor (e.g., GaN or SiC) having better physical properties than silicon has been included in a switching element.

A semiconductor (e.g., GaN) having good high-frequency properties in the switching element enables the switching element to operate at high operating frequencies, allowing an increase in the operating frequencies of the power supply circuit. For example, the GaN switching element is capable of switching at much higher frequencies than the conventional silicon switching element, allowing the power supply circuit to operate at much higher frequencies.

As the operating frequencies of the power supply circuit increase, passive components, particularly a power supply inductor having a large size, can be greatly reduced in size.

Thus, the power supply circuit can be greatly reduced in size. For the power supply inductor to operate at high operating frequencies, the inductor requires, as its core material, a magnetic material having a high permeability at high frequencies.

As a form of small-sized power supply inductors operable at high frequencies, a thin film inductor is optimal. The thin film inductor is manufactured by laminating a coil, a terminal, a magnetic film, an insulating layer, and the like on a substrate through semiconductor manufacturing processes. Because the magnetic film is a core of the thin film inductor, properties of the thin film inductor are heavily dependent on properties of the magnetic film.

Patent Document 1 discloses an amorphous alloy having a structure in which fine particles containing a metal element are dispersed in an amorphous film made from a nitrogen compound. Such a structure may now be referred to as a nanogranular structure. A magnetic film having this structure may be referred to as a nanogranular magnetic film.

For having both a saturation flux density (Bs) higher than that of ferrite materials and a specific resistance (ρ) higher than that of general magnetic alloys, a nanogranular magnetic film has a high permeability at high operating frequencies. Thus, application of the nanogranular magnetic film to the thin film inductor has been under consideration.

Patent Document 2 discloses a nanogranular magnetic film that contains elements such as Fe and Co and has various parameters measurable with a three-dimensional atom probe within specific ranges. This nanogranular magnetic film has a high coercive force and a low saturation flux density.

Patent Document 1: JP Patent Application Laid Open No. S60-152651

Patent Document 2: WO 2023/127199

SUMMARY

It is an object of the present invention to provide a nanogranular magnetic film having a high specific resistance with respect to saturation flux density (Bs).

To achieve the above object, a nanogranular magnetic film according to the present invention is a nanogranular magnetic film including:

first phases comprised of nano-domains dispersed in a second phase, wherein the first phases include Fe and Co;

the second phase includes at least one selected from the group consisting of O, N, and F; and a CV of Fe/(Fe+Co) of grids is 0.150 or more and 0.500 or less, provided that a measurement range is determined in the nanogranular magnetic film, the measurement range is divided with the grids including at least 80,000 grids each measuring 1 nm×1 nm×1 nm, and Fe/(Fe+Co) of each of the grids is measured in atomic ratio.

A volume ratio of a volume of the first phases to a total volume of the first phases and the second phase may be 40% or more and 65% or less.

Fe/(Fe+Co) of the grids may average 0.15 or more and 0.85 or less.

An electronic component according to the present invention includes the above nanogranular magnetic film.

BRIEF DESCRIPTION OF THE DRAWING(S)

DETAILED DESCRIPTION

Hereinafter, an embodiment of the present invention is described with reference to the drawings.

Figure 1:
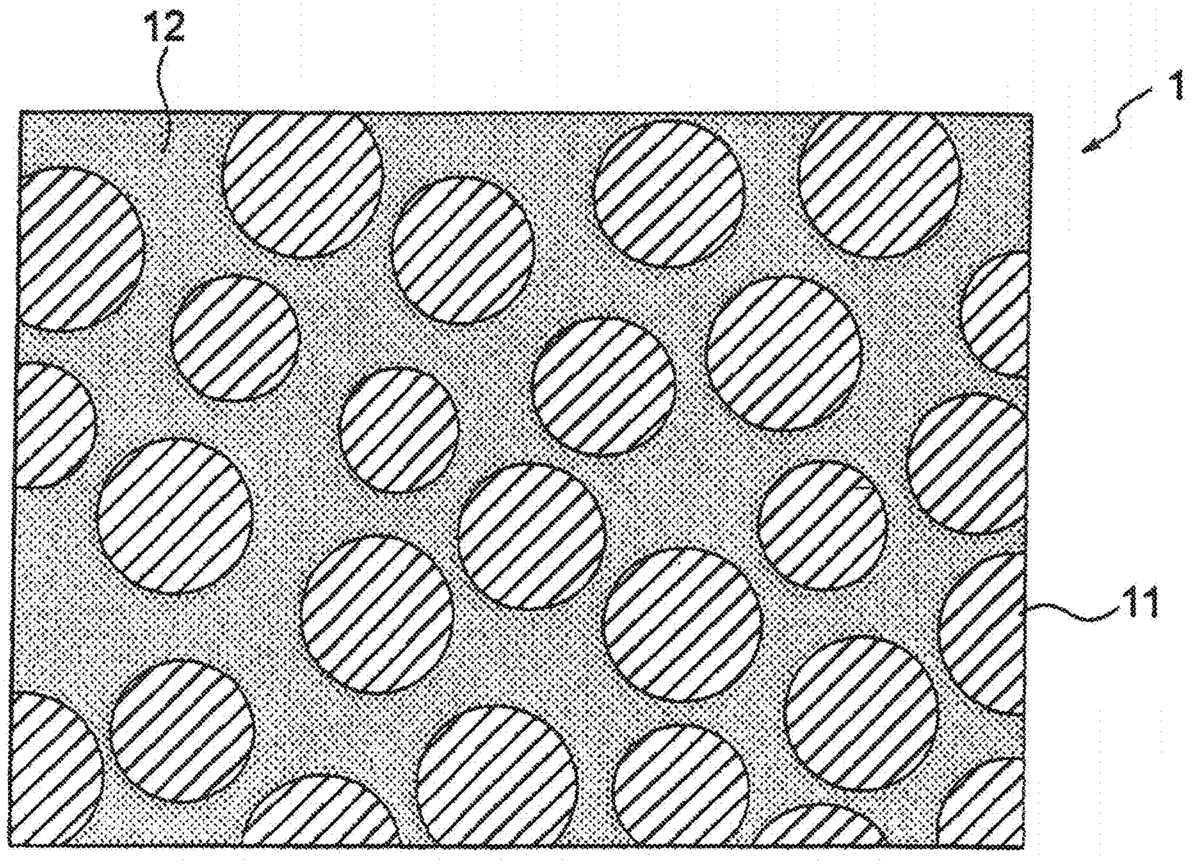
FIG. 1 is a sectional schematic view of a nanogranular magnetic film.

As shown in FIG. 1, a nanogranular magnetic film 1 according to the present embodiment has a nanogranular structure. In the nanogranular structure, first phases 11 (nano-domains) are dispersed in a second phase 12.

The nanogranular magnetic film refers to a thin film that has the above structure and includes the second phase that is not resin. Literally, a ribbon or a molded body is not a nanogranular magnetic film even if the ribbon or the molded body has a structure in which first phases 11 (nano-domains) are dispersed in a second phase 12.

The first phases 11 (nano-domains) have a nanoscale average size, i.e., an average size of 30 nm or less. The average size of the first phases 11 (nano-domains) may be 15 nm or less. Any method of measuring the sizes of the respective first phases 11 (nano-domains) may be used. For example, equivalent circle diameters of the first phases 11 (nano-domains) in a section of the nanogranular magnetic film 1 may be regarded as the sizes of the first phases 11 (nano-domains).

The equivalent circle diameters of the first phases 11 (nano-domains) in the section of the nanogranular magnetic film 1 denote the diameters of circles having the same areas as the areas of the first phases 11 (nano-domains) in the section of the nanogranular magnetic film 1.

The first phases 11 are phases containing metal elements. Specifically, the first phases 11 contain Fe and Co. The first phases 11 may contain Fe and Co in any manner. For example, the first phases 11 may contain Fe and Co at any ratio; as an alloy of Fe, Co, and other metal elements; or as a compound of Fe, Co, and other elements. A compound in the first phases 11 may be an oxide magnetic material, such as a ferrite.

The first phases 11 may have any total content of Fe and Co. The ratio of the total content of Fe and Co in the first phases 11 to the total content of Fe, Co, X1, and X2 in the first phases 11 may be 75 at % or more, 80 at % or more, 90 at % or more, or 95 at % or more. Note that, in calculation of the ratio, an element that accounts for a larger proportion of the second phase 12 than of the first phases 11 is not regarded as part of X1 or X2.

X1 includes at least one metalloid element. X1 may include, for example, at least one metalloid element selected from the group consisting of B, Si, P, C, and Ge.

X2 includes at least one metal element other than Fe and Co. X2 may include, for example, at least one metal element selected from the group consisting of Nb, Mo, Cu, Ti, Zr, Cr, Mn, V, W, Al, and Ni.

The first phases 11 may contain elements other than Fe, Co, X1, and X2. The ratio of the total content of the elements other than Fe, Co, X1, and X2 to the total content of Fe, Co, X1, and X2 may be 10 at % or less or may be 5 at % or less.

The second phase 12 is a phase containing at least one non-metal element. Specifically, the second phase 12 is a phase containing at least one selected from the group consisting of O, N, and F. The second phase 12 may contain the at least one element selected from the group consisting of O, N, and F in any manner. The second phase 12 may contain the at least one element selected from the group consisting of O, N, and F as, for example, a compound of the at least one element and other elements. That is, the second phase 12 may contain an oxide, a nitride, an oxynitride, and/or a fluoride of any elements other than 0, N, and F. The second phase 12 may contain an oxide, a nitride, and/or a fluoride of any elements other than 0, N, and F. The second phase 12 may be a mixed phase of an oxide, a nitride, and/or a fluoride.

The compound contained in the second phase 12 may be of any type. Examples thereof include $SiO_2$, $Al_2O_3$, AlN, $Si_3N_4$, $MgF_2$, BN, MgO, $GaO_2$, $GeO_2$, and $Si_3N_4{\cdot}Al_2O_3$. Among these compounds, oxides may be oxynitrides having oxygen partly substituted by nitrogen. That is, the compound contained in the second phase 12 may be a Si oxynitride, an Al oxynitride, a Mg oxynitride, a Ga oxynitride, or a Ge oxynitride; or may be a Si oxynitride or an Al oxynitride.

In a situation where the compound contained in the second phase 12 is an oxynitride, the ratio of the nitrogen content of the second phase 12 to the total content of oxygen and nitrogen of the second phase 12 (which may be referred to as N/(N+O) below) may exceed 0 at % and be 46 at % or less or may be 15 at % or more and 46 at % or less. Any method of measuring N/(N+O) of the second phase 12 may be used. N/(N+O) may be measured using, for example, an impulse heat melting extraction method. Note that it is difficult to use XRF. This is because it is difficult to ensure the accuracy of difficult measurement of the content of an element having a small atomic number (e.g., O or N).

The nanogranular magnetic film according to the present embodiment constitutes $(Fe_xCo_yX1_aX2_b)$—X3, where X1 includes at least one selected from the group consisting of B, P, C, and Ge;

X2 includes at least one selected from the group consisting of Nb, Mo, Cu, Al, Ti, Zr, Cr, Mn, V, W, Al, and Ni; and X3 includes at least one selected from the group consisting of $SiO_2$, $Al_2O_3$, AlN, ZnO, $MgF_2$, $GeO_2$, a Si oxynitride, an Al oxynitride, a Zn oxynitride, and a Ge oxynitride; and where $0.15 \le x \le 0.85$, $0.15 \le y \le 0.85$, $0 \le a \le 5.0$, $0 \le b \le 10.0$, and $0.90 \le x+y+a+b \le 1.00$ may be satisfied.

The above chemical formula shows that the composition of the first phases 11 is $Fe_xCo_yX1_aX2_b$ in atomic ratio and that the second phase 12 constitutes X3. X3 may include at least one selected from the group consisting of $SiO_2$, $Al_2O_3$, AlN, ZnO, $MgF_2$, $GeO_2$, and a Si oxynitride (Si—O—N). The ratio of the first phases 11 to the second phase 12 in terms of volume is described later.

The nanogranular magnetic film 1 according to the present embodiment may contain, as impurities, elements that are not constituents of the first phases 11 or the second phase 12. Out of 100 at % of all elements excluding O, N, and F in the nanogranular magnetic film, the nanogranular magnetic film may contain 5 at % or less impurities.

The volume ratio of the volume of the first phases 11 to the total volume of the first phases 11 and the second phase 12 is not limited. The volume ratio may be, for example, 70% or less or 65% or less. That is, $V_1/(V_1+V_2)$ may be 0.70 or less (70% or less) or 0.65 or less (65% or less), where $V_1$ denotes the volume ratio of the first phases 11 and $V_2$ denotes the volume ratio of the second phase 12. $V_1/(V_1+V_2)$ may be 0.60 or less (60% or less). The higher the volume ratio of the volume of the first phases 11 to the total volume of the first phases 11 and the second phase 12, the higher the Bs but lower the specific resistance.

There is no lower limit of the volume ratio of the volume of the first phases 11 to the total volume of the first phases 11 and the second phase 12. The lower limit may be 30% or more or 35% or more. That is, $V_1/(V_1+V_2)$ may be 0.30 or more (30% or more) or 0.35 or more (35% or more). $V_1/(V_1+V_2)$ may be 0.40 or more (40% or more). The lower the volume ratio of the volume of the first phases 11 to the total volume of the first phases 11 and the second phase 12, the higher the specific resistance but lower the Bs.

The first phases 11 may have a crystal structure. Specifically, the first phases 11 may have a body-centered cubic (bcc) crystal structure. With the bcc crystal structure, the saturation flux density (Bs) readily increases. Crystals in the crystal structure of the first phases may have an average crystal grain size of 1 nm or more and 30 nm or less or preferably 1.5 nm or more and 15 nm or less.

Any method of checking the crystal structure and the average crystal grain size may be used. The crystal structure can be checked using, for example, an X-ray diffraction (XRD) pattern analysis or an electron diffraction pattern analysis with a TEM or the like. The average crystal grain size can be checked from, for example, a TEM image or a STEM image. The average size of the first phases 11 (nano-domains) can be regarded as the average crystal grain size.

Any method of measuring $V_1/(V_1+V_2)$, which is the volume ratio of the volume of the first phases 11 to the total volume of the first phases 11 and the second phase 12, may be used. The volume ratio can be calculated from, for example, XRF measurement results of the nanogranular magnetic film 1. The volume ratio may also be calculated from the area ratio of the area of the first phases 11 to the total area of the first phases 11 and the second phase 12 through observation of a section of the nanogranular magnetic film 1 using a TEM. In this situation, the area ratio is converted into the volume ratio.

The nanogranular magnetic film 1 may include only the first phases 11 and the second phase 12, but may further include different phases other than the first phases 11 and the second phase 12. The proportion of the different phases is not limited. The different phases may account for an area ratio of 10% or less of the area of a section of the nanogranular magnetic film 1 observed with a TEM. The different phases may partly or entirely be a void.

All the first phases 11 are independent of another in FIG. 1. However, some of the first phases 11 may be connected.

The nanogranular magnetic film 1 may have any thickness. The thickness may be, for example, 50 nm or more and 200,000 nm or less. A suitable thickness may be appropriately selected according to usage. Any method of measuring the thickness of the nanogranular magnetic film 1 may be used. The thickness can be measured with, for example, a TEM, a SEM, or a surface profiler. Also, the reliability of measurement results may be checked by correlating multiple measurement apparatuses with each other in advance.

A measurement range having a volume of 80,000 $nm^3$ or more is determined in the nanogranular magnetic film 1. This measurement range is divided with grids of at least 80,000 cubes each measuring 1 nm×1 nm×1 nm. For all the grids, the atomic ratio of the constituent elements is measured. Then, Fe/(Fe+Co) of all the grids is measured to calculate their coefficient of variation (CV). A CV is a parameter calculated by dividing the standard deviation by the average.

The above measurement can be carried out with a three-dimensional atom probe (3DAP).

The CV of Fe/(Fe+Co) in the present embodiment is 0.150 or more and 0.500 or less. The nanogranular magnetic film having a CV of Fe/(Fe+Co) within the above range has a higher specific resistance with respect to Bs, compared to a conventional nanogranular magnetic film having a composition and a structure similar to those of the former nanogranular magnetic film except that the CV of Fe/(Fe+Co) is outside the above range. That is, the nanogranular magnetic film becomes a better material as a core material of a thin film inductor.

Fe/(Fe+Co) of the grids may average 0.15 or more and 0.85 or less. Note that this average of Fe/(Fe+Co) of the grids almost matches the average of Fe/(Fe+Co) of the nanogranular magnetic film as a whole.

A method of manufacturing the nanogranular magnetic film according to the present embodiment is described below.

Figure 2:
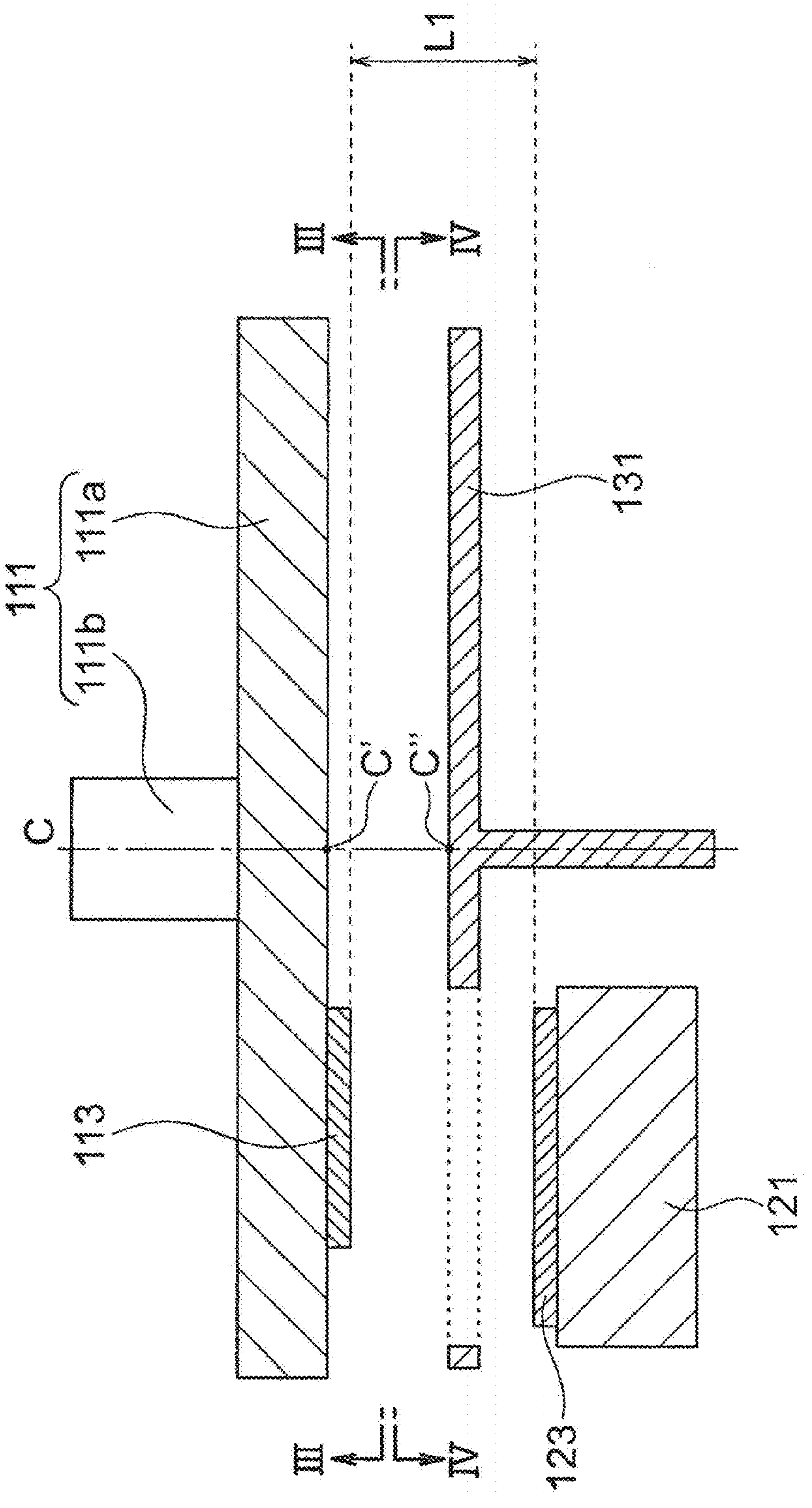
FIG. 2 is a sectional schematic view of a manufacturing apparatus.
Figure 3:
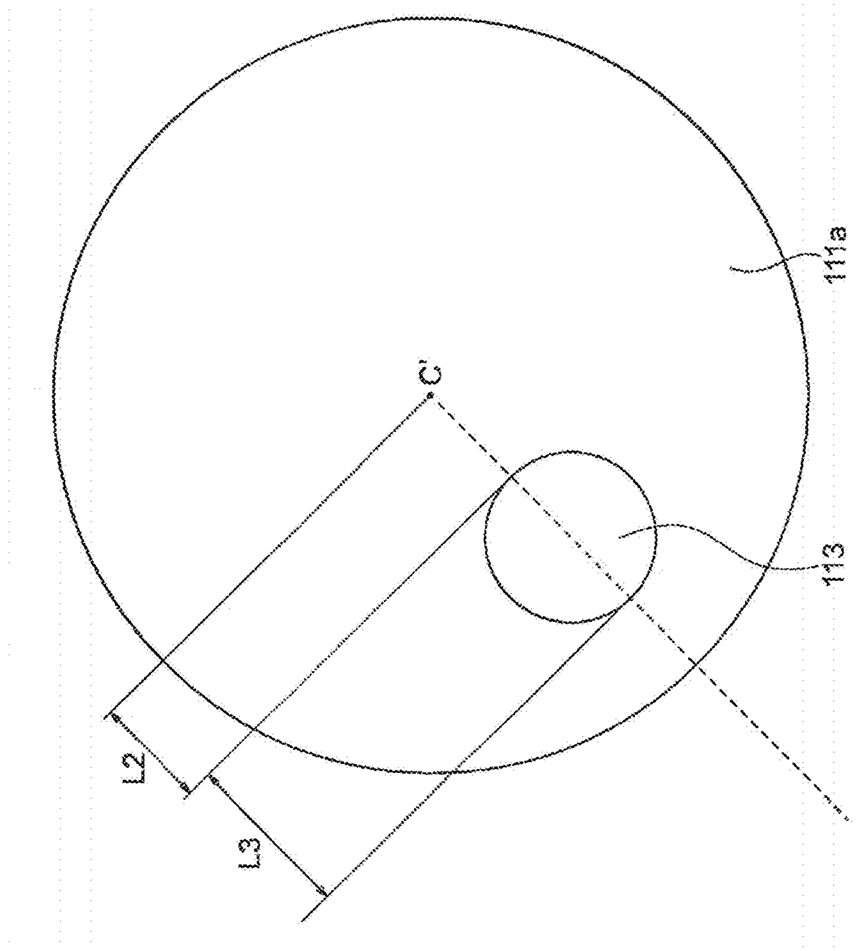
FIG. 3 is a schematic view of the manufacturing apparatus.
Figure 4:
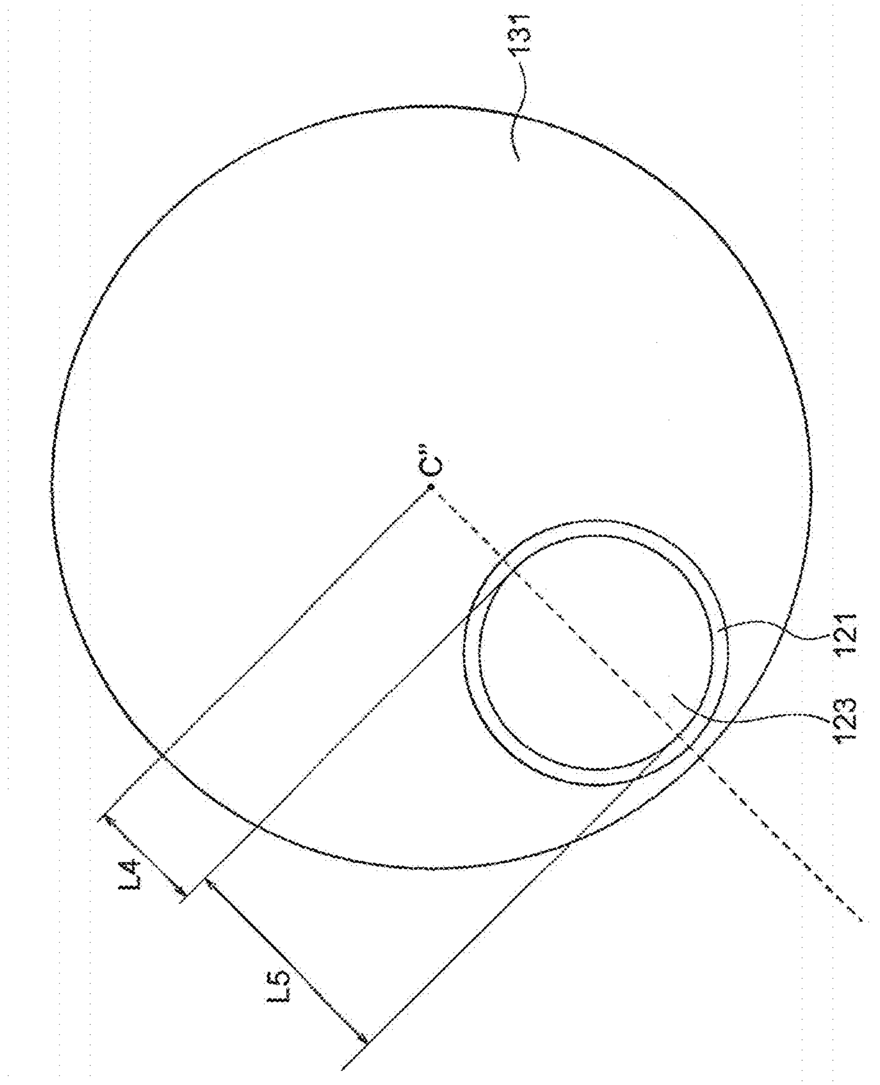
FIG. 4 is a schematic view of the manufacturing apparatus.

The nanogranular magnetic film according to the present embodiment is manufactured with a sputtering method using, for example, a manufacturing apparatus shown in FIGS. 2 to 4. FIG. 2 is a sectional schematic view of the manufacturing apparatus. FIG. 3 is a schematic view of the manufacturing apparatus (in particular, a rotation plate 111*a* and a substrate 113) viewed along the direction indicated by the arrow of line III-III shown in FIG. 2. FIG. 4 is a schematic view of the manufacturing apparatus (in particular, a shutter 131 and a sputtering target 123) viewed along the direction indicated by the arrow of line IV-IV shown in FIG. 2.

The substrate 113 on which to form the nanogranular magnetic film is fixed to the rotation plate 111*a* of a rotation member 111. The rotation plate 111*a* is fixed to a rotation axis 111*b*.

A substrate used as the substrate 113 on which to form the nanogranular magnetic film may be of any type. Examples of substrates include a silicon substrate, a silicon substrate having a thermal oxide film, a MgO substrate, a (non-magnetic) ferrite substrate, a sapphire substrate, a glass substrate, and a glass epoxy substrate. However, the substrate is not limited to these substrates. Any of various ceramic substrates or semiconductor substrates can be used.

On the above various substrates, constituent members (e.g., a coil or a wire) of a product or a component (e.g., thin film inductor) may be provided. For example, a substrate for a thin film inductor may be provided with a coil pattern or a wiring pattern for the thin film inductor.

Alternatively, instead of the above various substrates, foil or a sheet of metal, plastic, resin, or the like can be used as the substrate 113.

Preferred as preprocessing of the substrate 113 are a surface treatment with an $UV/O_3$ method under normal pressure and a vacuum surface treatment (e.g., reverse sputtering, ion milling, or plasma cleaning). Because a magnetic film for a thin film inductor has a large thickness, peeling-off of the film due to stress is highly problematic. However, carrying out both of the above surface treatments greatly improves this peeling-off of the film. The amount of time of each surface treatment is not limited. The treatment time of the $UV/O_3$ method may be, for example, 0.5 minutes or more and 60 minutes or less. In a situation where reverse sputtering is carried out as the vacuum surface treatment, the reverse sputtering time may be 0.1 minutes or more and 20 minutes or less.

The rotation plate 111*a* and the shutter 131 shown in FIGS. 3 and 4 may have any shapes. Their outer circumferential shape may be, for example, a perfect circle. An intersection of a dashed line C in FIG. 2 and a surface of the rotation plate 111*a* provided with the substrate 113 is denoted by point C'. An intersection of the dashed line C in FIG. 2 and the shutter 131 is denoted by point C". Point C' is a center of the rotation plate 111*a* having a perfectly circular outer circumference. Point C" is a center of the shutter 131 having a perfectly circular outer circumference.

The sputtering target 123 is attached to a sputtering apparatus 121. The sputtering target 123 may be of any type. However, in order for the nanogranular magnetic film to readily have a CV of Fe/(Fe+Co) of 0.150 or more and 0.500 or less, the sputtering target 123 is preferably a sputtering target produced by mixing and sintering Fe, Co, and the compound contained mainly in the second phase or by mixing and sintering an FeCo alloy and the compound.

Also, a chip containing a simple substance or a compound of any element other than Fe, Co, and the constituent elements of the compound contained mainly in the second phase may be appropriately placed on a surface of the sputtering target 123. Placing the chip allows the nanogranular magnetic film to contain the simple substance or the compound of any element other than Fe, Co, and the constituent elements of the compound contained mainly in the second phase. Note that, in a situation where the above method is used to let the nanogranular magnetic film contain the simple substance or the compound of any element other than Fe, Co, and the constituent elements of the compound contained mainly in the second phase, they may be contained in the first phases or the second phase.

However, in a situation where, instead of the above mixed and sintered sputtering target, a target that is produced with a sintering method or a melting method and is provided with, on its surface, an Fe chip, a Co chip, and/or a chip of the compound contained mainly in the second phase is used as the sputtering target 123, the CV of Fe/(Fe+Co) is readily reduced. This reduces the specific resistance with respect to Bs. Examples of targets produced with the sintering method or the melting method include a target containing only an FeCo alloy or a target containing only the compound contained mainly in the second phase.

The sputtering apparatus 121 may be of any type that can form the nanogranular magnetic film on the substrate 113 by sputtering.

As shown in FIG. 4, the shutter 131 has a hole above the sputtering target 123.

Rotation of the rotation axis 111*b* rotates the rotation plate 111*a* for sputtering. This intermittently forms the nanogranular magnetic film on the substrate 113.

Appropriately controlling the rotation speed of the rotation plate 111*a*, lengths L1 to L5, and the like changes a continuous film formation time and a continuously formed film thickness of the nanogranular magnetic film. A pseudo-multilayer of the nanogranular magnetic film is thus formed. That is, repeating a film forming step and a mitigating step forms the pseudo-multilayer of the nanogranular magnetic film.

Because locations of boundaries between layers of the pseudo-multilayer cannot be actually confirmed even with a TEM or the like, "pseudo-" is used. With formation of the pseudo-multilayer, the nanogranular magnetic film having a CV of Fe/(Fe+Co) of 0.150 or more and 0.500 or less, particularly 0.150 or more, is formed. This nanogranular magnetic film has an increased specific resistance with respect to Bs. Its reason is not clear; however, it is assumed that the reason is that intermittent formation of the nanogranular magnetic film mitigates stress in the nanogranular magnetic film.

The film formation time per layer of the pseudo-multilayer (which may be referred to as continuous film formation time) and the film thickness per layer of the pseudo-multilayer (which may be referred to as continuously formed film thickness) are not limited. The continuous film formation time may be 0.7 seconds or more and 5.0 seconds or less or may particularly be 3.4 seconds or less. The continuously formed film thickness may be 0.4 nm or more and 3.0 nm or less or may particularly be 2.0 nm or less. In particular, in a situation where the rotation speed is reduced to increase the continuous film formation time and the continuously formed film thickness, the CV of Fe/(Fe+Co) is readily reduced. This tends to reduce the specific resistance with respect to Bs.

The sputtering atmosphere is not limited and is preferably a gas atmosphere in which 0.05% or more and 3% or less, particularly 0.2%, $O_2$ gas is added to an inert gas (e.g., Ar gas, Kr gas, Xe gas, or Ne gas). In a situation where sputtering is carried out in an atmosphere to which the $O_2$ gas is not sufficiently added, the CV of Fe/(Fe+Co) is readily reduced. This tends to reduce the specific resistance with respect to Bs.

The nanogranular magnetic film formed by sputtering may be subject to an annealing treatment. The annealing temperature is not limited. The annealing temperature may be about 200° C. to about 500° C. or may be 250° C. to 450° C. The annealing time is not limited. The annealing time may be about 0.1 to about 180 minutes.

Any method of measuring magnetic properties of the resulting nanogranular magnetic film may be used. Measurement can be carried out using, for example, a vibrating sample magnetometer (VSM).

Hereinabove, one embodiment of the present invention has been described. However, the present invention is not limited to the above embodiment. For example, while the sputtering apparatus is fixed whereas the substrate is rotated in the above manufacturing method, it may be that the sputtering apparatus is rotated and that the substrate is fixed. Also, any manufacturing methods other than the method in which either the substrate or the sputtering apparatus is rotated may be used, provided that the pseudo-multilayer of the nanogranular magnetic film can be formed.

The nanogranular magnetic film according to the present embodiment may be used for any purpose. A magnetic material including the nanogranular magnetic film is suitably included in electronic components that are particularly used at high frequencies and are required to have a high Bs and a high specific resistance. Examples of such electronic components include a capacitor, a thin film inductor, a noise filter, a separator, a magneto-optical element, a TMR head, a GMR head, a magnetic sensor, and a magnetic recording medium.

EXAMPLES

Hereinafter, the present invention is specifically described based on examples.

Experiment 1

A nanogranular magnetic film was formed on a substrate using an apparatus shown in FIGS. 2 to 4. L1=90 mm, L2=2 inches, L3=3 inches, L4=2 inches, and L5=4 inches were satisfied. As the substrate, a silicon substrate having a thermal oxide film with a thickness of 0.28 mm was used. As preprocessing of the substrate, a surface treatment using an UV/$O_3$ method was carried out for 20 minutes. After that, reverse sputtering was further carried out under an Ar gas pressure of 1 Pa, at RF 100 W, for 5 minutes.

A sputtering target having a composition that provided the magnetic film with a composition shown in each Table and having a thickness of 2 mm was prepared.

With the apparatus shown in FIGS. 2 to 4, the nanogranular magnetic film was formed using a sputtering method. Table 1 shows whether preprocessing (UV/$O_3$ and reverse sputtering) was carried out, the rotation speed of a rotation plate at the time of sputtering, continuous film formation time, continuously formed film thickness, whether $O_2$ was contained in the Ar gas, and whether the sputtering target was a mixed and sintered sputtering target. As the sputtering apparatus, SPF430H manufactured by CANON ANELVA CORPORATION was used.

Through simple quantification using EDX (manufactured by JEOL Ltd.), it was confirmed that the compositions of first phases and a second phase of the nanogranular magnetic film were as shown in Table 1.

Using XRF (Primus IV manufactured by Rigaku Holdings Corporation), it was confirmed that $V_1/(V_1+V_2)$ of the nanogranular magnetic film was as shown in Table 1.

Using a TEM (JEM-2100F manufactured by JEOL Ltd.), it was confirmed that the nanogranular magnetic film of each sample had a structure in which the first phases (nano-domains) were dispersed in the second phase.

A method of measuring a CV of Fe/(Fe+Co) is described below. First, a measurement range having a rectangular parallelepiped shape measuring 40 nm×40 nm×50 nm (per side) was determined in the nanogranular magnetic film. In this continuous measurement range, 80,000 grids each measuring 1 nm×1 nm×1 nm were determined. Then, the Fe content and the Co content of each grid were measured using a three-dimensional atom probe (3DAP). Fe/(Fe+Co) of the grid was calculated in atomic ratio.

The standard deviation and the average of Fe/(Fe+Co) of the grids were calculated. The standard deviation was divided by the average to calculate the CV. The average of Fe/(Fe+Co) of the grids substantially matched the average of Fe/(Fe+Co) of the nanogranular magnetic film as a whole.

Using a VSM (TM-VSM331483-HGC) manufactured by TAMAKAWA CO., LTD., saturation flux density (Bs) was measured.

Using a resistivity meter (Loresta-EP MCP-T360 manufactured by Mitsubishi Chemical Corporation), sheet resistance was measured. From this sheet resistance, experimental specific resistance was calculated.

A method of measuring benchmark specific resistance for calculating a figure of merit is described below.

First, using a conventional sputtering method not involving rotation, nanogranular magnetic films were formed under substantially the same conditions except that the first phases had different Fe:Co ratios. That is, the nanogranular magnetic films were formed under substantially the same conditions except that the Fe:Co ratios of the first phases were about 85:15, about 70:30, about 45:55, and about 15:85 respectively in atomic ratio.

Specific manufacturing conditions were as follows. The rotation speed was 0. The continuous film formation time was 25,000 seconds. The processing gas used for sputtering was a mixed gas of Ar mixed with 0.2% $O_2$. The continuously formed film thickness was within a range of (5,000±200) nm. The nanogranular magnetic films having the same composition with different Fe:Co ratios of the first phases were thus formed. In Experiment 1, these nanogranular magnetic films corresponded to Comparative Examples 1 to 4.

Next, using the above methods, saturation flux density (Bs) and experimental specific resistance of the nanogranular magnetic films of Comparative Examples 1 to 4 were measured.

Next, such results of Comparative Examples 2 to 4 were plotted as points in an xy plane having an x-axis representing Bs (T) and a y-axis representing specific resistance (Ωcm).

Then, using power approximation, a formula for a performance curve was derived. This formula for the performance curve derived from Comparative Examples 2 to 4 was $y=0.0044\times x^{-11.25}$.

The Bs value of each nanogranular magnetic film was substituted into the formula for the performance curve to give specific resistance, which was used as the benchmark specific resistance. A quotient of the experimental specific resistance of the nanogranular magnetic film divided by the benchmark specific resistance of the nanogranular magnetic film was defined as its figure of merit. A figure of merit of 1.20 or more was defined as good.

Comparative Example 5 was carried out as in Example 3 except that Ar was used as the processing gas for sputtering. Comparative Example 6 was carried out with an Fe chip and a Co chip each measuring 5 mm×5 mm arranged on a commercially available $SiO_2$ sputtering target so that the composition of the first phases, the composition of the second phase, and $V_1/(V_1+V_2)$ of the nanogranular magnetic film eventually obtained were the same as those of Example 3.

Comparative Example 7 was carried out as in Example 3 except that the $UV/O_3$ processing and reverse sputtering were not carried out.

TABLE 1

| | Film formation conditions | | | | | | | Magnetic film | | | | | | Evaluation of figure of merit | | | |
|---|---|---|---|---|---|---|---|---|---|---|---|---|---|---|---|---|---|
| | Pre-processing | | | | | | | | | | | | | | | | |
| Sample No. | $UV/O_3$ | Reverse sputtering | Rotation speed rpm | Continuous film formation time s | Continuously formed film thickness nm | Ar-0.2% $O_2$ | Mixed and sintered sputtering target | First phases Atomic ratio | Second phase Atomic ratio | $V_1/(V_1+V_2)$ % | Film thickness nm | CV | Bs T | Experimental specific resistance Ωcm | Benchmark specific resistance Ωcm | Figure of merit | OK/Not OK |
| Comparative Example 1 | Yes | Yes | 0 | 25000 | 4877 | Yes | Yes | $Fe_{85}Co_{15}$ | $SiO_2$ | 46 | 4877 | 0.105 | 0.584 | 1.86 | 1.87 | 1.00 | Not OK |
| Comparative Example 2 | Yes | Yes | 0 | 25000 | 4967 | Yes | Yes | $Fe_{70}Co_{30}$ | $SiO_2$ | 46 | 4967 | 0.107 | 0.579 | 2.05 | 2.06 | 1.00 | Not OK |

TABLE 1-continued

| | Preprocessing | | Film formation conditions | | | | | Magnetic film | | | | | | Evaluation of figure of merit | | | |
|---|---|---|---|---|---|---|---|---|---|---|---|---|---|---|---|---|---|
| Sample No. | UV/$O_3$ | Reverse sputtering | Rotation speed rpm | Continuous film formation time s | Continuously formed film thickness nm | Ar-0.2% $O_2$ | Mixed and sintered sputtering target | First phases Atomic ratio | Second phase Atomic ratio | $V_1/(V_1+V_2)$ % | Film thickness nm | CV | Bs T | Experimental specific resistance Ωcm | Benchmark specific resistance Ωcm | Figure of merit | OK/Not OK |
| Comparative Example 3 | Yes | Yes | 0 | 25000 | 4874 | Yes | Yes | $Fe_{45}Co_{55}$ | $SiO_2$ | 46 | 4874 | 0.110 | 0.563 | 2.80 | 2.82 | 0.99 | Not OK |
| Comparative Example 4 | Yes | Yes | 0 | 25000 | 4874 | Yes | Yes | $Fe_{15}Co_{85}$ | $SiO_2$ | 46 | 4874 | 0.112 | 0.542 | 4.31 | 4.32 | 1.00 | Not OK |
| Example 1 | Yes | Yes | 12 | 1.7 | 1.0 | Yes | Yes | $Fe_{85}Co_{15}$ | $SiO_2$ | 46 | 5012 | 0.251 | 0.691 | 0.94 | 0.28 | 3.35 | OK |
| Example 2 | Yes | Yes | 12 | 1.7 | 1.0 | Yes | Yes | $Fe_{70}Co_{30}$ | $SiO_2$ | 46 | 5101 | 0.261 | 0.689 | 0.97 | 0.29 | 3.35 | OK |
| Example 3 | Yes | Yes | 12 | 1.7 | 1.0 | Yes | Yes | $Fe_{45}Co_{55}$ | $SiO_2$ | 46 | 4876 | 0.275 | 0.667 | 1.16 | 0.42 | 2.77 | OK |
| Example 4 | Yes | Yes | 12 | 1.7 | 1.0 | Yes | Yes | $Fe_{15}Co_{85}$ | $SiO_2$ | 46 | 5033 | 0.287 | 0.636 | 1.75 | 0.72 | 2.45 | OK |
| Comparative Example 5 | Yes | Yes | 12 | 1.7 | 1.0 | No | Yes | $Fe_{45}Co_{55}$ | $SiO_2$ | 46 | 4875 | 0.149 | 0.633 | 0.81 | 0.75 | 1.07 | Not OK |
| Comparative Example 6 | Yes | Yes | 12 | 1.7 | 1.0 | Yes | No | $Fe_{45}Co_{55}$ | $SiO_2$ | 46 | 5162 | 0.098 | 0.614 | 1.03 | 1.06 | 0.97 | Not OK |
| Comparative Example 7 | No | No | 12 | 1.7 | 1.0 | Yes | Yes | $Fe_{45}Co_{55}$ | $SiO_2$ | 46 | — | — | — | — | — | — | — |

According to Table 1, in Examples 1 to 4, in which the rotation plate was rotated at a rotation speed of 12 rpm, the CV was within a predetermined range. In Examples 1 to 4, the figure of merit was good. That is, compared to the conventional nanogranular magnetic films formed without rotations, the specific resistance with respect to Bs was higher, which was good.

In both Comparative Examples 5 and 6, in which other manufacturing conditions were changed, the CV was less than 0.150, and the figure of merit was less than 1.20.

In Comparative Example 7, in which preprocessing was not carried out, the film was peeled off from the substrate; and it was not possible to conduct evaluation.

Experiment 2

Comparative Examples 8 to 10 and Examples 5 to 8 were carried out as in Example 2 except that the rotation speed was changed ranging from 1 rpm to 40 rpm. Similarly, Comparative Examples 11 to 12 and Examples 9 to 11 were carried out as in Example 3 except that the rotation speed was changed ranging from 2 rpm to 40 rpm. Comparative Examples 13 to 14 and Examples 12 to 14 were carried out as in Example 4 except that the rotation speed was changed ranging from 2 rpm to 40 rpm. Table 2 shows the results.

TABLE 2

| | Film formation conditions | | | | | Magnetic film | | | | | Evaluation of figure of merit | | | |
|---|---|---|---|---|---|---|---|---|---|---|---|---|---|---|
| Sample No. | Rotation speed rpm | Continuous film formation time s | Continuously formed film thickness nm | 0.2% $O_2$ | Mixed and sintered | First phases Atomic ratio | Second phase Atomic ratio | Film thickness nm | CV | Bs T | Experimental specific resistance Ωcm | Benchmark specific resistance Ωcm | Figure of merit | OK/ Not OK |
| Comparative Example 8 | 1 | 20 | 12 | Yes | Yes | $Fe_{70}Co_{30}$ | $SiO_2$ | 5012 | 0.128 | 0.601 | 1.17 | 1.35 | 0.87 | Not OK |
| Comparative Example 9 | 2 | 10 | 6 | Yes | Yes | $Fe_{70}Co_{30}$ | $SiO_2$ | 5002 | 0.139 | 0.619 | 1.12 | 0.97 | 1.15 | Not OK |
| Example 5 | 4 | 5 | 3 | Yes | Yes | $Fe_{70}Co_{30}$ | $SiO_2$ | 5007 | 0.153 | 0.631 | 1.02 | 0.78 | 1.30 | OK |
| Example 6 | 6 | 3.4 | 2 | Yes | Yes | $Fe_{70}Co_{30}$ | $SiO_2$ | 5086 | 0.204 | 0.660 | 1.00 | 0.47 | 2.12 | OK |
| Example 2 | 12 | 1.7 | 1.0 | Yes | Yes | $Fe_{70}Co_{30}$ | $SiO_2$ | 5101 | 0.261 | 0.689 | 0.97 | 0.29 | 3.35 | OK |
| Example 7 | 20 | 1.0 | 0.6 | Yes | Yes | $Fe_{70}Co_{30}$ | $SiO_2$ | 4972 | 0.342 | 0.662 | 0.91 | 0.46 | 2.00 | OK |
| Example 8 | 30 | 0.7 | 0.4 | Yes | Yes | $Fe_{70}Co_{30}$ | $SiO_2$ | 4972 | 0.492 | 0.641 | 0.82 | 0.66 | 1.25 | OK |
| Comparative Example 10 | 40 | 0.5 | 0.3 | Yes | Yes | $Fe_{70}Co_{30}$ | $SiO_2$ | 4916 | 0.519 | 0.635 | 0.77 | 0.73 | 1.06 | Not OK |
| Comparative Example 11 | 2 | 10 | 6 | Yes | Yes | $Fe_{45}Co_{55}$ | $SiO_2$ | 4973 | 0.142 | 0.592 | 1.71 | 1.60 | 1.07 | Not OK |
| Example 9 | 4 | 5 | 3 | Yes | Yes | $Fe_{45}Co_{55}$ | $SiO_2$ | 4928 | 0.156 | 0.613 | 1.39 | 1.08 | 1.28 | OK |
| Example 10 | 6 | 3.4 | 2 | Yes | Yes | $Fe_{45}Co_{55}$ | $SiO_2$ | 4891 | 0.208 | 0.645 | 1.22 | 0.61 | 2.00 | OK |
| Example 3 | 12 | 1.7 | 1.0 | Yes | Yes | $Fe_{45}Co_{55}$ | $SiO_2$ | 4876 | 0.275 | 0.667 | 1.16 | 0.42 | 2.77 | OK |
| Example 11 | 30 | 1.0 | 0.4 | Yes | Yes | $Fe_{45}Co_{55}$ | $SiO_2$ | 4890 | 0.488 | 0.631 | 1.05 | 0.78 | 1.34 | OK |
| Comparative Example 12 | 40 | 0.5 | 0.3 | Yes | Yes | $Fe_{45}Co_{55}$ | $SiO_2$ | 5015 | 0.512 | 0.622 | 0.99 | 0.92 | 1.08 | Not OK |
| Comparative Example 13 | 2 | 10 | 6 | Yes | Yes | $Fe_{15}Co_{85}$ | $SiO_2$ | 4905 | 0.147 | 0.557 | 3.23 | 3.18 | 1.02 | Not OK |
| Example 12 | 4 | 5 | 3 | Yes | Yes | $Fe_{15}Co_{85}$ | $SiO_2$ | 5021 | 0.160 | 0.590 | 2.07 | 1.66 | 1.24 | OK |
| Example 13 | 6 | 3.4 | 2 | Yes | Yes | $Fe_{15}Co_{85}$ | $SiO_2$ | 5016 | 0.211 | 0.617 | 1.95 | 1.01 | 1.94 | OK |
| Example 4 | 12 | 1.7 | 1.0 | Yes | Yes | $Fe_{15}Co_{85}$ | $SiO_2$ | 5033 | 0.287 | 0.636 | 1.75 | 0.72 | 2.45 | OK |
| Example 14 | 30 | 1.0 | 0.4 | Yes | Yes | $Fe_{15}Co_{85}$ | $SiO_2$ | 4927 | 0.487 | 0.618 | 1.41 | 0.99 | 1.43 | OK |
| Comparative Example 14 | 40 | 0.5 | 0.3 | Yes | Yes | $Fe_{15}Co_{85}$ | $SiO_2$ | 4973 | 0.507 | 0.608 | 1.30 | 1.19 | 1.09 | Not OK |

According to Table 2, in Examples 5 to 14, in which the CV was within the predetermined range, the figure of merit was good similarly to Examples 2 to 4. By contrast, in Comparative Examples 8 to 14, in which the CV was outside the predetermined range, the figure of merit was not good.

Experiment 3

Comparative Examples 15 to 26 and Examples 15 to 26 shown in Table 3 were carried out as in Comparative Examples 2 to 4 and Examples 2 to 4 except that an additional element chip containing an additional element was placed on the sputtering target. The individual additional element chip had a rectangular parallelepiped shape having two largest 5-mm sided square surfaces and a thickness of about 0.5 mm. The number of additional element chips was determined so that the composition of the first phases and the composition of the second phase of the nanogranular magnetic films eventually obtained were as shown in each Table and that $V_1/(V_1+V_2)$ was close to that of Experiment 1. The compositions of the respective phases of the nanogranular magnetic films shown in each Table were compositions on the premise that the additional element was contained entirely in the first phases. In Experiments 3 to 4 and 6 to 8, it was actually confirmed that the additional element was substantially entirely contained in the first phases.

First, formulae for performance curves were derived from Comparative Examples having the same amount of the same additional element added but having different Fe:Co ratios. The formula for the performance curve derived from Comparative Examples 15 to 17, in which 1 atom % Nb was added, was $y=0.0033\times x^{-11.11}$. The formula for the performance curve derived from Comparative Examples 18 to 20, in which 2 atom % Nb was added, was $y=0.0020\times x^{-11.18}$. The formula for the performance curve derived from Comparative Examples 21 to 23, in which 5 atom % Nb was added, was $y=0.0008\times x^{-11.16}$. The formula for the performance curve derived from Comparative Examples 24 to 26, in which 10 atom % Nb was added, was $y=0.0004\times x^{-11.3}$.

The formula for the performance curve derived from Comparative Examples 27 to 29, in which 2 atom % Mo was added, was $y=0.0016\times x^{-11.37}$. The formula for the performance curve derived from Comparative Examples 30 to 32, in which 2 atom % Cu was added, was $y=0.0022\times x^{-11.05}$.

The Bs value of each nanogranular magnetic film was substituted into the corresponding formula for the performance curve derived from Comparative Examples having the same amount of the same additional element added to give specific resistance, which was used as the benchmark specific resistance. A quotient of the experimental specific resistance of the nanogranular magnetic film divided by the benchmark specific resistance of the nanogranular magnetic film was defined as its figure of merit. Tables 3 and 4 show the results.

TABLE 3

| Sample No. | Rotation | Magnetic film: First phases Atomic ratio | Second phase Atomic ratio | $V_1/(V_1+V_2)$ % | Film thickness nm | CV | Bs T | Evaluation of figure of merit: Experimental specific resistance Ωcm | Benchmark specific resistance Ωcm | Figure of merit | OK/Not OK |
|---|---|---|---|---|---|---|---|---|---|---|---|
| Comparative Example 2 | No | $Fe_{70}Co_{30}$ | $SiO_2$ | 46 | 4967 | 0.107 | 0.579 | 2.05 | 2.06 | 1.00 | Not OK |
| Comparative Example 3 | No | $Fe_{45}Co_{55}$ | $SiO_2$ | 46 | 4874 | 0.110 | 0.563 | 2.80 | 2.82 | 0.99 | Not OK |
| Comparative Example 4 | No | $Fe_{15}Co_{85}$ | $SiO_2$ | 46 | 4874 | 0.112 | 0.542 | 4.31 | 4.32 | 1.00 | Not OK |
| Example 2 | Yes | $Fe_{70}Co_{30}$ | $SiO_2$ | 46 | 5101 | 0.261 | 0.689 | 0.97 | 0.29 | 3.35 | OK |
| Example 3 | Yes | $Fe_{45}Co_{55}$ | $SiO_2$ | 46 | 4876 | 0.275 | 0.667 | 1.16 | 0.42 | 2.77 | OK |
| Example 4 | Yes | $Fe_{15}Co_{85}$ | $SiO_2$ | 46 | 5033 | 0.287 | 0.636 | 1.75 | 0.72 | 2.45 | OK |
| Comparative Example 15 | No | $Fe_{69}Co_{30}Nb_1$ | $SiO_2$ | 47 | 5004 | 0.108 | 0.573 | 1.61 | 1.60 | 1.00 | Not OK |
| Comparative Example 16 | No | $Fe_{45}Co_{54}Nb_1$ | $SiO_2$ | 47 | 5021 | 0.111 | 0.560 | 2.05 | 2.07 | 0.99 | Not OK |
| Comparative Example 17 | No | $Fe_{15}Co_{84}Nb_1$ | $SiO_2$ | 47 | 4898 | 0.115 | 0.539 | 3.17 | 3.17 | 1.00 | Not OK |
| Example 15 | Yes | $Fe_{69}Co_{30}Nb_1$ | $SiO_2$ | 47 | 5007 | 0.282 | 0.676 | 0.73 | 0.26 | 2.85 | OK |
| Example 16 | Yes | $Fe_{45}Co_{54}Nb_1$ | $SiO_2$ | 47 | 5023 | 0.294 | 0.648 | 1.02 | 0.41 | 2.49 | OK |
| Example 17 | Yes | $Fe_{15}Co_{84}Nb_1$ | $SiO_2$ | 47 | 4991 | 0.302 | 0.625 | 1.47 | 0.61 | 2.40 | OK |
| Comparative Example 18 | No | $Fe_{69}Co_{29}Nb_2$ | $SiO_2$ | 47 | 4974 | 0.111 | 0.561 | 1.26 | 1.28 | 0.98 | Not OK |
| Comparative Example 19 | No | $Fe_{44}Co_{54}Nb_2$ | $SiO_2$ | 47 | 4899 | 0.112 | 0.553 | 1.46 | 1.50 | 0.97 | Not OK |
| Comparative Example 20 | No | $Fe_{15}Co_{83}Nb_2$ | $SiO_2$ | 47 | 5043 | 0.116 | 0.530 | 2.37 | 2.42 | 0.98 | Not OK |
| Example 18 | Yes | $Fe_{69}Co_{29}Nb_2$ | $SiO_2$ | 47 | 5011 | 0.288 | 0.664 | 0.62 | 0.19 | 3.19 | OK |
| Example 19 | Yes | $Fe_{44}Co_{54}Nb_2$ | $SiO_2$ | 47 | 4987 | 0.298 | 0.633 | 0.92 | 0.33 | 2.77 | OK |
| Example 20 | Yes | $Fe_{15}Co_{83}Nb_2$ | $SiO_2$ | 47 | 4865 | 0.306 | 0.613 | 1.26 | 0.48 | 2.65 | OK |
| Comparative Example 21 | No | $Fe_{67}Co_{28}Nb_5$ | $SiO_2$ | 49 | 4896 | 0.113 | 0.531 | 0.97 | 0.94 | 1.04 | Not OK |
| Comparative Example 22 | No | $Fe_{43}Co_{52}Nb_5$ | $SiO_2$ | 49 | 4911 | 0.115 | 0.520 | 1.20 | 1.18 | 1.02 | Not OK |
| Comparative Example 23 | No | $Fe_{14}Co_{81}Nb_5$ | $SiO_2$ | 49 | 4791 | 0.119 | 0.512 | 1.46 | 1.40 | 1.04 | Not OK |
| Example 21 | Yes | $Fe_{67}Co_{28}Nb_5$ | $SiO_2$ | 49 | 5004 | 0.295 | 0.631 | 0.45 | 0.14 | 3.30 | OK |
| Example 22 | Yes | $Fe_{43}Co_{52}Nb_5$ | $SiO_2$ | 49 | 4991 | 0.303 | 0.611 | 0.57 | 0.20 | 2.92 | OK |
| Example 23 | Yes | $Fe_{14}Co_{81}Nb_5$ | $SiO_2$ | 49 | 4883 | 0.308 | 0.596 | 0.71 | 0.26 | 2.75 | OK |
| Comparative Example 24 | No | $Fe_{63}Co_{27}Nb_{10}$ | $SiO_2$ | 50 | 4896 | 0.114 | 0.515 | 0.73 | 0.72 | 1.01 | Not OK |
| Comparative Example 25 | No | $Fe_{40}Co_{50}Nb_{10}$ | $SiO_2$ | 50 | 4911 | 0.118 | 0.503 | 0.94 | 0.94 | 1.00 | Not OK |
| Comparative Example 26 | No | $Fe_{14}Co_{76}Nb_{10}$ | $SiO_2$ | 50 | 4791 | 0.122 | 0.494 | 1.17 | 1.16 | 1.01 | Not OK |
| Example 24 | Yes | $Fe_{63}Co_{27}Nb_{10}$ | $SiO_2$ | 50 | 5004 | 0.303 | 0.610 | 0.37 | 0.11 | 3.47 | OK |
| Example 25 | Yes | $Fe_{40}Co_{50}Nb_{10}$ | $SiO_2$ | 50 | 4991 | 0.315 | 0.584 | 0.50 | 0.17 | 2.87 | OK |
| Example 26 | Yes | $Fe_{14}Co_{76}Nb_{10}$ | $SiO_2$ | 50 | 4883 | 0.320 | 0.572 | 0.59 | 0.22 | 2.68 | OK |

TABLE 4

| Sample No. | Rotation | Magnetic film: First phases Atomic ratio | Second phase Atomic ratio | $V_1/(V_1+V_2)$ % | Film thickness nm | CV | Bs T | Evaluation of figure of merit: Experimental specific resistance Ωcm | Benchmark specific resistance Ωcm | Figure of merit | OK/Not OK |
|---|---|---|---|---|---|---|---|---|---|---|---|
| Comparative Example 2 | No | $Fe_{70}Co_{30}$ | $SiO_2$ | 46 | 4967 | 0.107 | 0.579 | 2.05 | 2.06 | 1.00 | Not OK |
| Comparative Example 3 | No | $Fe_{45}Co_{55}$ | $SiO_2$ | 46 | 4874 | 0.110 | 0.563 | 2.80 | 2.82 | 0.99 | Not OK |
| Comparative Example 4 | No | $Fe_{15}Co_{85}$ | $SiO_2$ | 46 | 4874 | 0.112 | 0.542 | 4.31 | 4.32 | 1.00 | Not OK |
| Example 2 | Yes | $Fe_{70}Co_{30}$ | $SiO_2$ | 46 | 5101 | 0.261 | 0.689 | 0.97 | 0.29 | 3.35 | OK |
| Example 3 | Yes | $Fe_{45}Co_{55}$ | $SiO_2$ | 46 | 4876 | 0.275 | 0.667 | 1.16 | 0.42 | 2.77 | OK |
| Example 4 | Yes | $Fe_{15}Co_{85}$ | $SiO_2$ | 46 | 5033 | 0.287 | 0.636 | 1.75 | 0.72 | 2.45 | OK |
| Comparative Example 18 | No | $Fe_{69}Co_{29}Nb_2$ | $SiO_2$ | 47 | 4974 | 0.111 | 0.561 | 1.26 | 1.28 | 0.98 | Not OK |
| Comparative Example 19 | No | $Fe_{44}Co_{54}Nb_2$ | $SiO_2$ | 47 | 4899 | 0.112 | 0.553 | 1.46 | 1.50 | 0.97 | Not OK |

TABLE 4-continued

| | | Magnetic film | | | | | | Evaluation of figure of merit | | | |
|---|---|---|---|---|---|---|---|---|---|---|---|
| Sample No. | Rotation | First phases Atomic ratio | Second phase Atomic ratio | $V_1/(V_1+V_2)$ % | Film thickness nm | CV | Bs T | Experimental specific resistance Ωcm | Benchmark specific resistance Ωcm | Figure of merit | OK/ Not OK |
| Comparative Example 20 | No | $Fe_{15}Co_{83}Nb_2$ | $SiO_2$ | 47 | 5043 | 0.116 | 0.530 | 2.37 | 2.42 | 0.98 | Not OK |
| Example 18 | Yes | $Fe_{69}Co_{29}Nb_2$ | $SiO_2$ | 47 | 5011 | 0.288 | 0.664 | 0.60 | 0.19 | 3.08 | OK |
| Example 19 | Yes | $Fe_{44}Co_{54}Nb_2$ | $SiO_2$ | 47 | 4987 | 0.298 | 0.633 | 0.89 | 0.33 | 2.68 | OK |
| Example 20 | Yes | $Fe_{15}Co_{83}Nb_2$ | $SiO_2$ | 47 | 4865 | 0.306 | 0.613 | 1.21 | 0.48 | 2.54 | OK |
| Comparative Example 27 | No | $Fe_{69}Co_{29}Mo_2$ | $SiO_2$ | 47 | 4965 | 0.110 | 0.558 | 1.23 | 1.22 | 1.01 | Not OK |
| Comparative Example 28 | No | $Fe_{44}Co_{54}Mo_2$ | $SiO_2$ | 47 | 4889 | 0.114 | 0.552 | 1.37 | 1.37 | 1.00 | Not OK |
| Comparative Example 29 | No | $Fe_{15}Co_{83}Mo_2$ | $SiO_2$ | 47 | 4932 | 0.118 | 0.524 | 2.50 | 2.48 | 1.01 | Not OK |
| Example 27 | Yes | $Fe_{69}Co_{29}Mo_2$ | $SiO_2$ | 47 | 4956 | 0.274 | 0.651 | 0.63 | 0.21 | 2.99 | OK |
| Example 28 | Yes | $Fe_{44}Co_{54}Mo_2$ | $SiO_2$ | 47 | 4971 | 0.289 | 0.627 | 0.89 | 0.32 | 2.76 | OK |
| Example 29 | Yes | $Fe_{15}Co_{83}Mo_2$ | $SiO_2$ | 47 | 4968 | 0.296 | 0.609 | 1.21 | 0.45 | 2.69 | OK |
| Comparative Example 30 | No | $Fe_{69}Co_{29}Cu_2$ | $SiO_2$ | 47 | 4881 | 0.110 | 0.565 | 1.22 | 1.21 | 1.01 | Not OK |
| Comparative Example 31 | No | $Fe_{44}Co_{54}Cu_2$ | $SiO_2$ | 47 | 5004 | 0.112 | 0.555 | 1.41 | 1.47 | 0.96 | Not OK |
| Comparative Example 32 | No | $Fe_{15}Co_{83}Cu_2$ | $SiO_2$ | 47 | 5012 | 0.115 | 0.534 | 2.25 | 2.25 | 1.00 | Not OK |
| Example 30 | Yes | $Fe_{69}Co_{29}Cu_2$ | $SiO_2$ | 47 | 4992 | 0.266 | 0.659 | 0.62 | 0.22 | 2.81 | OK |
| Example 31 | Yes | $Fe_{44}Co_{54}Cu_2$ | $SiO_2$ | 47 | 4895 | 0.278 | 0.638 | 0.88 | 0.32 | 2.79 | OK |
| Example 32 | Yes | $Fe_{15}Co_{83}Cu_2$ | $SiO_2$ | 47 | 4903 | 0.294 | 0.620 | 1.15 | 0.43 | 2.66 | OK |

According to Tables 3 and 4, in each Example, in which the rotation plate was rotated at a rotation speed of 12 rpm, the CV was within the predetermined range, and the figure of merit was good. That is, compared to the conventional nanogranular magnetic films formed without rotations, the specific resistance with respect to Bs was higher, which was good.

Experiment 4

In Experiments 1 to 3, three Comparative Examples corresponding to each additional element and its amount added were prepared to derive the formulae for the performance curves. In Experiment 4, a way of temporarily checking properties of nanogranular magnetic films using a simple method was explored.

A formula for a performance curve was derived using power approximation. Thus, the formula was represented by a general formula $y=A\times x^B$.

In comparison between the performance curves derived in Experiments 1 to 3, a difference in "A" resulting from a change of the amount of the additional element added was large, whereas a difference in "B" resulting from such a change was small. By contrast, provided that the amount of the additional element added stayed the same, there were small differences in "A" and "B" despite a change of the additional element.

Thus, it was assumed that it was possible to conduct sufficiently accurate evaluation by calculating the figure of merit on the supposition that the additional element was Nb even if the additional element was different from Nb.

"A" and "B" of the performance curves derived from Comparative Examples 2 to 4 and 15 to 26 were as follows: A=0.0044 and B=−11.25 when there was no additional element (additional element 0%); A=0.0033 and B=−11.11 at an additional element of 1%; A=0.0020 and B=−11.18 at an additional element of 2%; A=0.0008 and B=−11.16 at an additional element of 5%; and A=0.0004 and B=−11.30 at an additional element of 10%. Thus, the value of "A" was required to be selected according to the concentration of the additional element, and the value of "B" was able to stay fixed regardless of the concentration of the additional element.

Details of how to select the values of "A" and "B" in the way of temporarily checking properties of the nanogranular magnetic films using the simple method are provided below.

How to Select Value of "A"

A graph having a horizontal axis representing the amount of the additional element added (%) and a vertical axis representing the value of "A" was created. Then, point a (0, 0.0044), point b (1, 0.0033), point c (2, 0.0020), point d (5, 0.0008), and point e (10, 0.0004) were plotted in the graph. Points a and b were connected with a straight line. Points b and c were connected with a straight line. Points c and d were connected with a straight line. Points d and e were connected with a straight line. Using the resulting line graph, the value of "A" was selected according to the amount of the additional element added.

For example, if the amount of the additional element added was 0.6%, the value of "A" selected would be $0.0044\times0.4+0.0033\times0.6=0.00374$.

How to Select Value of "B"

Regardless of the concentration of the additional element, −11.20 was selected as the value of "B". This value of "B" was an arithmetic mean (average) of −11.25, −11.11, −11.18, −11.16, and −11.30, which were the values of "B" at the above-mentioned amounts added.

Definition of Simple Figure of Merit

A simple figure of merit was defined as follows. Values of "A" and "B" selected using the above methods according to the amount added were substituted into the general formula $y=A\times x^B$. This formula with the substituted values was defined as a formula for a simple performance curve. Benchmark specific resistance found from this formula was defined as simple benchmark specific resistance. A figure of merit found from the simple benchmark specific resistance and the experimental specific resistance was defined as the simple figure of merit. The formula for the simple performance curve allowed the simple figure of merit to be calculated for evaluation of properties without manufacture of samples at a rotation speed of 0 rpm.

The figure of merit and the simple figure of merit of Comparative Examples 11 to 12 and Examples 3 and 9 to 11, which were under substantially the same conditions except for the rotation speed, were compared. Because the additional element of these samples was 0%, the parameters of the formula for the simple performance curve were A=0.0044 and B=−11.20. Table 5 shows the results of calculation of the simple figure of merit as well as the figure of merit.

The figure of merit and the simple figure of merit of Examples 18 to 20, 27 to 29, and 30 to 32, which had 2% additional element added and had the additional element varying, were compared. Because the amount of the additional element was 2%, the parameters of the formula for the simple performance curve were A=0.0020 and B=−11.20. Table 6 shows the results of calculation of the simple figure of merit as well as the figure of merit.

In all Comparative Examples and Examples shown in Tables 5 and 6, the figure of merit and the simple figure of merit were not the same but were relatively close. Thus, it was possible to conduct sufficiently accurate evaluation using the simple figure of merit.

Experiment 5

Examples 33 to 44 were carried out as in Examples 19, 28, and 31 except that the additional element was changed from those of Examples 19, 28, and 31 to find the CV and the simple figure of merit. Examples 45 to 46 were carried out as in Example 22 except that the additional element was changed from that of Example 22 to find the CV and the simple figure of merit. Examples 47 to 48 were carried out as in Example 25 except that the additional element was changed from that of Example 25 to find the CV and the simple figure of merit. Table 7 shows the results.

TABLE 5

| | Film formation conditions | | | | | Magnetic film | | | | | Evaluation of figure of merit | | | | | |
|---|---|---|---|---|---|---|---|---|---|---|---|---|---|---|---|---|
| Sample No. | Rotation speed rpm | Continuous film formation time s | Continuously formed film thickness nm | 0.2% $O_2$ | Mixed and sintered | First phases Atomic ratio | Second phase Atomic ratio | Film thickness nm | CV | Bs T | Experimental specific resistance Ωcm | Simple benchmark specific resistance Ωcm | Simple figure of merit | Benchmark specific resistance Ωcm | Figure of merit | OK/Not OK |
| Comparative Example 11 | 2 | 10 | 6 | Yes | Yes | $Fe_{45}Co_{55}$ | $SiO_2$ | 4973 | 0.142 | 0.592 | 1.71 | 1.56 | 1.10 | 1.60 | 1.07 | Not OK |
| Example 9 | 4 | 5 | 3 | Yes | Yes | $Fe_{45}Co_{55}$ | $SiO_2$ | 4928 | 0.156 | 0.613 | 1.39 | 1.06 | 1.32 | 1.08 | 1.28 | OK |
| Example 10 | 6 | 3.4 | 2 | Yes | Yes | $Fe_{45}Co_{55}$ | $SiO_2$ | 4891 | 0.208 | 0.645 | 1.22 | 0.60 | 2.04 | 0.61 | 2.00 | OK |
| Example 3 | 12 | 1.7 | 1.0 | Yes | Yes | $Fe_{45}Co_{55}$ | $SiO_2$ | 4876 | 0.275 | 0.667 | 1.16 | 0.41 | 2.83 | 0.42 | 2.77 | OK |
| Example 11 | 30 | 1.0 | 0.4 | Yes | Yes | $Fe_{45}Co_{55}$ | $SiO_2$ | 4890 | 0.488 | 0.631 | 1.05 | 0.76 | 1.37 | 0.78 | 1.34 | OK |
| Comparative Example 12 | 40 | 0.5 | 0.3 | Yes | Yes | $Fe_{45}Co_{55}$ | $SiO_2$ | 5015 | 0.512 | 0.622 | 0.99 | 0.90 | 1.10 | 0.92 | 1.08 | Not OK |

TABLE 6

| | Magnetic film | | | | | | Evaluation of figure of merit | | | | | |
|---|---|---|---|---|---|---|---|---|---|---|---|---|
| Sample No. | First phases Atomic ratio | Second phase Atomic ratio | $V_1/(V_1+V_2)$ % | Film thickness nm | CV | Bs T | Experimental specific resistance Ωcm | Simple benchmark specific resistance Ωcm | Simple figure of merit | Benchmark specific resistance Ωcm | Figure of merit | OK/Not OK |
| Example 18 | $Fe_{69}Co_{29}Nb_2$ | $SiO_2$ | 47 | 5011 | 0.288 | 0.664 | 0.60 | 0.20 | 3.06 | 0.19 | 3.08 | OK |
| Example 19 | $Fe_{44}Co_{54}Nb_2$ | $SiO_2$ | 47 | 4987 | 0.298 | 0.633 | 0.89 | 0.34 | 2.66 | 0.33 | 2.68 | OK |
| Example 20 | $Fe_{15}Co_{83}Nb_2$ | $SiO_2$ | 47 | 4865 | 0.306 | 0.613 | 1.21 | 0.48 | 2.52 | 0.48 | 2.54 | OK |
| Example 27 | $Fe_{69}Co_{29}Mo_2$ | $SiO_2$ | 47 | 4956 | 0.274 | 0.651 | 0.63 | 0.24 | 2.57 | 0.21 | 2.99 | OK |
| Example 28 | $Fe_{44}Co_{54}Mo_2$ | $SiO_2$ | 47 | 4971 | 0.289 | 0.627 | 0.89 | 0.37 | 2.39 | 0.32 | 2.76 | OK |
| Example 29 | $Fe_{15}Co_{83}Mo_2$ | $SiO_2$ | 47 | 4968 | 0.296 | 0.609 | 1.21 | 0.52 | 2.34 | 0.45 | 2.69 | OK |
| Example 30 | $Fe_{69}Co_{29}Cu_2$ | $SiO_2$ | 47 | 4992 | 0.266 | 0.659 | 0.62 | 0.21 | 2.90 | 0.22 | 2.81 | OK |
| Example 31 | $Fe_{44}Co_{54}Cu_2$ | $SiO_2$ | 47 | 4895 | 0.278 | 0.638 | 0.88 | 0.31 | 2.87 | 0.32 | 2.79 | OK |
| Example 32 | $Fe_{15}Co_{83}Cu_2$ | $SiO_2$ | 47 | 4903 | 0.294 | 0.620 | 1.15 | 0.42 | 2.72 | 0.43 | 2.66 | OK |

TABLE 7

| Sample No. | Magnetic film: First phases Atomic ratio | Magnetic film: Second phase Atomic ratio | Magnetic film: $V_1/(V_1+V_2)$ % | Magnetic film: Film thickness nm | Magnetic film: CV | Magnetic film: Bs T | Evaluation of figure of merit: Experimental specific resistance Ωcm | Evaluation of figure of merit: Simple benchmark specific resistance Ωcm | Evaluation of figure of merit: Simple figure of merit | Evaluation of figure of merit: OK/Not OK |
|---|---|---|---|---|---|---|---|---|---|---|
| Example 19 | $Fe_{44}Co_{54}Nb_2$ | $SiO_2$ | 47 | 4987 | 0.298 | 0.633 | 0.89 | 0.34 | 2.66 | OK |
| Example 28 | $Fe_{44}Co_{54}Mo_2$ | $SiO_2$ | 47 | 4971 | 0.289 | 0.627 | 0.89 | 0.37 | 2.39 | OK |
| Example 31 | $Fe_{44}Co_{54}Cu_2$ | $SiO_2$ | 47 | 4895 | 0.278 | 0.638 | 0.88 | 0.31 | 2.87 | OK |
| Example 33 | $Fe_{44}Co_{54}Ti_2$ | $SiO_2$ | 47 | 5031 | 0.289 | 0.645 | 0.82 | 0.27 | 3.02 | OK |
| Example 34 | $Fe_{44}Co_{54}Zr_2$ | $SiO_2$ | 47 | 5012 | 0.289 | 0.640 | 0.86 | 0.30 | 2.90 | OK |
| Example 35 | $Fe_{44}Co_{54}Cr_2$ | $SiO_2$ | 47 | 5026 | 0.290 | 0.634 | 0.95 | 0.33 | 2.88 | OK |
| Example 36 | $Fe_{44}Co_{54}Mn_2$ | $SiO_2$ | 47 | 5079 | 0.284 | 0.639 | 0.87 | 0.30 | 2.88 | OK |
| Example 37 | $Fe_{45}Co_{53}B_2$ | $SiO_2$ | 47 | 5063 | 0.277 | 0.635 | 1.02 | 0.32 | 3.15 | OK |
| Example 38 | $Fe_{44}Co_{54}C_2$ | $SiO_2$ | 47 | 5045 | 0.265 | 0.629 | 1.0 | 0.36 | 2.81 | OK |
| Example 39 | $Fe_{45}Co_{53}P_2$ | $SiO_2$ | 47 | 5038 | 0.275 | 0.633 | 1.04 | 0.34 | 3.10 | OK |
| Example 40 | $Fe_{44}Co_{54}Ge_2$ | $SiO_2$ | 47 | 5019 | 0.281 | 0.630 | 0.97 | 0.35 | 2.74 | OK |
| Example 41 | $Fe_{44}Co_{54}V_2$ | $SiO_2$ | 47 | 5007 | 0.294 | 0.635 | 0.93 | 0.32 | 2.87 | OK |
| Example 42 | $Fe_{45}Co_{53}W_2$ | $SiO_2$ | 47 | 4913 | 0.296 | 0.632 | 0.90 | 0.34 | 2.64 | OK |
| Example 43 | $Fe_{44}Co_{54}Al_2$ | $SiO_2$ | 47 | 4934 | 0.288 | 0.634 | 0.95 | 0.33 | 2.88 | OK |
| Example 44 | $Fe_{44}Co_{54}Ni_2$ | $SiO_2$ | 47 | 4944 | 0.264 | 0.651 | 0.82 | 0.24 | 3.35 | OK |
| Example 22 | $Fe_{43}Co_{52}Nb_5$ | $SiO_2$ | 49 | 4991 | 0.303 | 0.611 | 0.57 | 0.20 | 2.86 | OK |
| Example 45 | $Fe_{43}Co_{52}P_5$ | $SiO_2$ | 49 | 5011 | 0.279 | 0.605 | 0.70 | 0.22 | 3.15 | OK |
| Example 46 | $Fe_{43}Co_{52}Ni_5$ | $SiO_2$ | 49 | 5003 | 0.281 | 0.628 | 0.52 | 0.15 | 3.55 | OK |
| Example 25 | $Fe_{40}Co_{50}Nb_{10}$ | $SiO_2$ | 50 | 4991 | 0.315 | 0.584 | 0.50 | 0.17 | 3.03 | OK |
| Example 47 | $Fe_{40}Co_{50}P_{10}$ | $SiO_2$ | 50 | 5028 | 0.295 | 0.577 | 0.55 | 0.19 | 2.91 | OK |
| Example 48 | $Fe_{40}Co_{50}Ni_{10}$ | $SiO_2$ | 50 | 5008 | 0.297 | 0.606 | 0.43 | 0.11 | 3.94 | OK |

According to Table 7, even with the varied additional element, the CV of the nanogranular magnetic films was 0.150 or more and 0.500 or less, and the simple figure of merit was good. If three Comparative Examples corresponding to the composition of each Example were prepared to calculate the figure of merit, it would be highly probable that the calculated figure of merit would be 1.20 or more.

Experiment 6

Changes in the CV and the simple figure of merit when the rotation speed was changed in manufacture of nanogranular magnetic films having an additional element added were confirmed. Comparative Examples 33 to 34 and Examples 49 to 50 were carried out as in Example 31 except that the rotation speed was changed. Comparative Examples 35 to 36 and Examples 51 to 52 were carried out as in Example 39 except that the rotation speed was changed. Comparative Examples 37 to 38 and Examples 53 to 54 were carried out as in Example 44 except that the rotation speed was changed. Table 8 shows the results.

TABLE 8

| Sample No. | Film formation conditions: Rotation speed rpm | Film formation conditions: Continuous film formation time s | Film formation conditions: Continuously formed film thickness nm | Film formation conditions: 0.2% $O_2$ | Film formation conditions: Mixed and sintered | Magnetic film: First phases Atomic ratio | Magnetic film: Second phase Atomic ratio | Magnetic film: Film thickness nm | Magnetic film: CV | Magnetic film: Bs T | Evaluation of figure of merit: Experimental specific resistance Ωcm | Evaluation of figure of merit: Simple benchmark specific resistance Ωcm | Evaluation of figure of merit: Simple figure of merit | Evaluation of figure of merit: OK/Not OK |
|---|---|---|---|---|---|---|---|---|---|---|---|---|---|---|
| Comparative Example 33 | 2 | 10 | 6.0 | Yes | Yes | $Fe_{44}Co_{54}Cu_2$ | $SiO_2$ | 4872 | 0.145 | 0.575 | 1.13 | 0.98 | 1.15 | Not OK |
| Example 49 | 4 | 5 | 3.0 | Yes | Yes | $Fe_{44}Co_{54}Cu_2$ | $SiO_2$ | 4905 | 0.172 | 0.598 | 1.02 | 0.63 | 1.61 | OK |
| Example 31 | 12 | 1.7 | 1.0 | Yes | Yes | $Fe_{44}Co_{54}Cu_2$ | $SiO_2$ | 4895 | 0.278 | 0.638 | 0.88 | 0.31 | 2.87 | OK |
| Example 50 | 30 | 1.0 | 0.4 | Yes | Yes | $Fe_{44}Co_{54}Cu_2$ | $SiO_2$ | 4913 | 0.493 | 0.619 | 0.70 | 0.43 | 1.63 | OK |
| Comparative Example 34 | 40 | 0.5 | 0.3 | Yes | Yes | $Fe_{44}Co_{54}Cu_2$ | $SiO_2$ | 4920 | 0.526 | 0.602 | 0.56 | 0.59 | 0.95 | Not OK |
| Comparative Example 35 | 2 | 10 | 6.0 | Yes | Yes | $Fe_{44}Co_{54}P_2$ | $SiO_2$ | 5033 | 0.145 | 0.570 | 1.27 | 1.08 | 1.17 | Not OK |
| Example 51 | 4 | 5 | 3.0 | Yes | Yes | $Fe_{44}Co_{54}P_2$ | $SiO_2$ | 5072 | 0.182 | 0.592 | 1.15 | 0.71 | 1.62 | OK |
| Example 39 | 12 | 1.7 | 1.0 | Yes | Yes | $Fe_{44}Co_{54}P_2$ | $SiO_2$ | 5038 | 0.275 | 0.633 | 1.04 | 0.34 | 3.10 | OK |
| Example 52 | 30 | 1.0 | 0.4 | Yes | Yes | $Fe_{44}Co_{54}P_2$ | $SiO_2$ | 5014 | 0.490 | 0.614 | 0.81 | 0.47 | 1.72 | OK |
| Comparative Example 36 | 40 | 0.5 | 0.3 | Yes | Yes | $Fe_{44}Co_{54}P_2$ | $SiO_2$ | 4996 | 0.518 | 0.598 | 0.70 | 0.63 | 1.10 | Not OK |
| Comparative Example 37 | 2 | 10 | 6.0 | Yes | Yes | $Fe_{44}Co_{54}Ni_2$ | $SiO_2$ | 4884 | 0.143 | 0.582 | 0.98 | 0.86 | 1.14 | Not OK |

TABLE 8-continued

| Sample No. | Film formation conditions: Rotation speed rpm | Continuous film formation time s | Continuously formed film thickness nm | 0.2% $O_2$ | Mixed and sintered | Magnetic film: First phases Atomic ratio | Second phase Atomic ratio | Film thickness nm | CV | Bs T | Evaluation of figure of merit: Experimental specific resistance Ωcm | Simple benchmark specific resistance Ωcm | Simple figure of merit | OK/ Not OK |
|---|---|---|---|---|---|---|---|---|---|---|---|---|---|---|
| Example 53 | 4 | 5 | 3.0 | Yes | Yes | $Fe_{44}Co_{54}Ni_2$ | $SiO_2$ | 4913 | 0.175 | 0.611 | 0.91 | 0.50 | 1.83 | OK |
| Example 44 | 12 | 1.7 | 1.0 | Yes | Yes | $Fe_{44}Co_{54}Ni_2$ | $SiO_2$ | 4944 | 0.264 | 0.655 | 0.82 | 0.23 | 3.59 | OK |
| Example 54 | 30 | 1.0 | 0.4 | Yes | Yes | $Fe_{44}Co_{54}Ni_2$ | $SiO_2$ | 4967 | 0.494 | 0.623 | 0.73 | 0.40 | 1.82 | OK |
| Comparative Example 38 | 40 | 0.5 | 0.3 | Yes | Yes | $Fe_{44}Co_{54}Ni_2$ | $SiO_2$ | 4934 | 0.522 | 0.606 | 0.61 | 0.55 | 1.12 | Not OK |

According to Table 8, in Examples 31, 39, 44, and 49 to 54, the CV was 0.150 or more and 0.500 or less, and the simple figure of merit was good. That is, no difference depending on the additional element was confirmed.

Experiment 7

Experiment 7 was conducted as in Example 3 except that the compound contained in the second phase was changed from $SiO_2$. Examples 62 to 64 were carried out with different volume ratios of $SiO_2$ to $Al_2O_3$ in the second phase. In Experiment 7, the simple figure of merit was calculated on the supposition that, even if the compound contained in the second phase was different from $SiO_2$, the compound was equivalent to $SiO_2$. Table 9 shows the results.

TABLE 9

| Sample No. | Magnetic film: First phases Atomic ratio | Second phase Atomic ratio | $V_1/(V_1+V_2)$ % | Film thickness nm | CV | Bs T | Evaluation of figure of merit: Experimental specific resistance Ωcm | Simple benchmark specific resistance Ωcm | Simple figure of merit | OK/ Not OK |
|---|---|---|---|---|---|---|---|---|---|---|
| Example 3 | $Fe_{45}Co_{55}$ | $SiO_2$ | 46 | 4876 | 0.275 | 0.667 | 1.16 | 0.41 | 2.83 | OK |
| Example 55 | $Fe_{45}Co_{55}$ | $Al_2O_3$ | 46 | 4922 | 0.288 | 0.662 | 1.04 | 0.45 | 2.33 | OK |
| Example 56 | $Fe_{45}Co_{55}$ | AlN | 46 | 4887 | 0.304 | 0.657 | 0.97 | 0.49 | 2.00 | OK |
| Example 57 | $Fe_{45}Co_{55}$ | $Si_3N_4$ | 46 | 4929 | 0.302 | 0.648 | 1.09 | 0.57 | 1.92 | OK |
| Example 58 | $Fe_{45}Co_{55}$ | $MgF_2$ | 46 | 4887 | 0.315 | 0.646 | 1.08 | 0.59 | 1.84 | OK |
| Example 59 | $Fe_{45}Co_{55}$ | BN | 46 | 4930 | 0.326 | 0.648 | 1.01 | 0.57 | 1.78 | OK |
| Example 60 | $Fe_{45}Co_{55}$ | MgO | 46 | 4953 | 0.332 | 0.648 | 1.00 | 0.57 | 1.76 | OK |
| Example 61 | $Fe_{45}Co_{55}$ | $GaO_2$ | 46 | 5027 | 0.388 | 0.647 | 0.92 | 0.58 | 1.59 | OK |
| Example 62 | $Fe_{45}Co_{55}$ | $SiO_2 + Al_2O_3$ (1:1 vol %) | 46 | 4954 | 0.280 | 0.660 | 1.10 | 0.46 | 2.38 | OK |
| Example 63 | $Fe_{45}Co_{55}$ | $SiO_2 + Al_2O_3$ (4:1 vol %) | 46 | 5025 | 0.277 | 0.662 | 1.13 | 0.45 | 2.53 | OK |
| Example 64 | $Fe_{45}Co_{55}$ | $SiO_2 + Al_2O_3$ (1:4 vol %) | 46 | 4916 | 0.282 | 0.658 | 1.06 | 0.48 | 2.22 | OK |

According to Table 9, even with the varied compound contained in the second phase, the CV and the simple figure of merit of the nanogranular magnetic films were good. If three Comparative Examples corresponding to the composition of each Example were prepared to calculate the figure of merit, it would be highly probable that the calculated figure of merit would be 1.20 or more.

Experiment 8-1

Experiment 8-1 was conducted as in Example 3 except that $V_1/(V_1+V_2)$ was greatly changed. In Experiment 8-1, the simple figure of merit was calculated on the supposition that, even if $V_1/(V_1+V_2)$ was greatly different from 46%, $V_1/(V_1+V_2)$ was about 46%. Table 10-1 shows the results.

TABLE 10-1

| Sample No. | Magnetic film: First phases Atomic ratio | Second phase Atomic ratio | $V_1/(V_1+V_2)$ % | Film thickness nm | CV | Bs T | Evaluation of figure of merit: Experimental specific resistance Ωcm | Simple benchmark specific resistance Ωcm | Simple figure of merit | OK/ Not OK |
|---|---|---|---|---|---|---|---|---|---|---|
| Example 101a | $Fe_{45}Co_{55}$ | $SiO_2$ | 35 | 4736 | 0.152 | 0.405 | 138.0 | 109.6 | 1.26 | OK |
| Example 65 | $Fe_{45}Co_{55}$ | $SiO_2$ | 40 | 4965 | 0.253 | 0.521 | 16.5 | 6.5 | 2.53 | OK |
| Example 3 | $Fe_{45}Co_{55}$ | $SiO_2$ | 46 | 4876 | 0.275 | 0.667 | 1.16 | 0.41 | 2.83 | OK |
| Example 101 | $Fe_{45}Co_{55}$ | $SiO_2$ | 50 | 4771 | 0.285 | 0.704 | 0.49 | 0.22 | 2.19 | OK |
| Example 102 | $Fe_{45}Co_{55}$ | $SiO_2$ | 52 | 4826 | 0.292 | 0.821 | 0.104 | 0.040 | 2.60 | OK |
| Example 103 | $Fe_{45}Co_{55}$ | $SiO_2$ | 54 | 4739 | 0.298 | 0.848 | 0.067 | 0.028 | 2.40 | OK |
| Example 66 | $Fe_{45}Co_{55}$ | $SiO_2$ | 56 | 4898 | 0.305 | 0.899 | 0.030 | 0.014 | 2.07 | OK |
| Example 104 | $Fe_{45}Co_{55}$ | $SiO_2$ | 58 | 4911 | 0.314 | 0.931 | 0.022 | 0.010 | 2.24 | OK |
| Example 67 | $Fe_{45}Co_{55}$ | $SiO_2$ | 60 | 4906 | 0.323 | 0.951 | 0.016 | 0.0077 | 2.07 | OK |
| Example 68 | $Fe_{45}Co_{55}$ | $SiO_2$ | 65 | 4934 | 0.335 | 1.050 | 0.0052 | 0.0025 | 2.04 | OK |
| Example 104a | $Fe_{45}Co_{55}$ | $SiO_2$ | 70 | 5078 | 0.441 | 1.148 | 0.0012 | 0.0009 | 1.28 | OK |

According to Table 10-1, even with greatly varied $V_1/(V_1+V_2)$, the CV and the simple figure of merit of the nanogranular magnetic films were good. If three Comparative Examples corresponding to each Example were prepared to calculate the figure of merit, it would be highly probable that the calculated figure of merit would be 1.20 or more.

Experiment 8-2

Experiment 8-2 was conducted as in Examples 66, 67, 102, and 103 except that the ratio of Fe to Co in the first phases was changed. Table 10-2 shows the results.

Further, this experiment was conducted as in Examples 103 and 108 to 110 except that the compound contained in the second phase was changed. Table 10-2 shows the results.

According to Table 10-2, even with the varied composition of the first phases and/or the varied compound contained in the second phase, the CV and the simple figure of merit of the nanogranular magnetic films were good. If three Comparative Examples corresponding to each Example were prepared to calculate the figure of merit, it would be highly probable that the calculated figure of merit would be 1.20 or more.

Experiment 8-3

Experiment 8-3 was conducted as in Examples 67, 102, 103, 108 to 110, and 117 to 120 except that nitrogen was introduced into the second phase. To introduce nitrogen into the second phase, nitrogen with 0.2% oxygen was introduced into the processing gas used for sputtering. By changing the nitrogen concentration of the processing gas, the

TABLE 10-2

| Sample No. | Magnetic film: First phases Atomic ratio | Second phase Atomic ratio | $V_1/(V_1+V_2)$ % | Film thickness nm | CV | Bs T | Evaluation of figure of merit: Experimental specific resistance Ωcm | Simple benchmark specific resistance Ωcm | Simple figure of merit | OK/ Not OK |
|---|---|---|---|---|---|---|---|---|---|---|
| Example 105a | $Fe_5Co_{95}$ | $SiO_2$ | 52 | 4860 | 0.312 | 0.773 | 0.148 | 0.079 | 1.88 | OK |
| Example 105 | $Fe_{15}Co_{85}$ | $SiO_2$ | 52 | 4834 | 0.305 | 0.801 | 0.134 | 0.053 | 2.54 | OK |
| Example 102 | $Fe_{45}Co_{55}$ | $SiO_2$ | 52 | 4826 | 0.292 | 0.821 | 0.104 | 0.040 | 2.60 | OK |
| Example 106 | $Fe_{60}Co_{40}$ | $SiO_2$ | 52 | 4799 | 0.284 | 0.872 | 0.059 | 0.020 | 2.89 | OK |
| Example 107 | $Fe_{85}Co_{15}$ | $SiO_2$ | 52 | 4720 | 0.275 | 0.888 | 0.044 | 0.017 | 2.64 | OK |
| Example 107a | $Fe_{90}Co_{10}$ | $SiO_2$ | 52 | 4703 | 0.235 | 0.874 | 0.038 | 0.020 | 1.91 | OK |
| Example 108 | $Fe_{15}Co_{85}$ | $SiO_2$ | 54 | 4865 | 0.309 | 0.821 | 0.090 | 0.040 | 2.25 | OK |
| Example 103 | $Fe_{45}Co_{55}$ | $SiO_2$ | 54 | 4739 | 0.298 | 0.848 | 0.067 | 0.028 | 2.40 | OK |
| Example 109 | $Fe_{60}Co_{40}$ | $SiO_2$ | 54 | 4697 | 0.290 | 0.895 | 0.041 | 0.015 | 2.69 | OK |
| Example 110 | $Fe_{85}Co_{15}$ | $SiO_2$ | 54 | 4722 | 0.281 | 0.907 | 0.032 | 0.013 | 2.44 | OK |
| Example 111 | $Fe_{15}Co_{85}$ | $SiO_2$ | 56 | 4872 | 0.312 | 0.866 | 0.044 | 0.022 | 2.00 | OK |
| Example 66 | $Fe_{45}Co_{55}$ | $SiO_2$ | 56 | 4898 | 0.305 | 0.899 | 0.030 | 0.014 | 2.07 | OK |
| Example 112 | $Fe_{60}Co_{40}$ | $SiO_2$ | 56 | 4901 | 0.300 | 0.932 | 0.022 | 0.010 | 2.27 | OK |
| Example 113 | $Fe_{85}Co_{15}$ | $SiO_2$ | 56 | 4945 | 0.288 | 0.945 | 0.018 | 0.0083 | 2.17 | OK |
| Example 114 | $Fe_{15}Co_{85}$ | $SiO_2$ | 60 | 4935 | 0.338 | 0.922 | 0.022 | 0.011 | 2.01 | OK |
| Example 67 | $Fe_{45}Co_{55}$ | $SiO_2$ | 60 | 4906 | 0.323 | 0.951 | 0.016 | 0.0077 | 2.07 | OK |
| Example 115 | $Fe_{60}Co_{40}$ | $SiO_2$ | 60 | 4910 | 0.313 | 0.982 | 0.012 | 0.0054 | 2.23 | OK |
| Example 116 | $Fe_{85}Co_{15}$ | $SiO_2$ | 60 | 4874 | 0.301 | 0.996 | 0.010 | 0.0046 | 2.13 | OK |
| Example 117 | $Fe_{15}Co_{85}$ | $Al_2O_3$ | 54 | 4845 | 0.314 | 0.818 | 0.085 | 0.042 | 2.04 | OK |
| Example 118 | $Fe_{45}Co_{55}$ | $Al_2O_3$ | 54 | 4865 | 0.302 | 0.847 | 0.064 | 0.028 | 2.26 | OK |
| Example 119 | $Fe_{60}Co_{40}$ | $Al_2O_3$ | 54 | 4898 | 0.295 | 0.891 | 0.039 | 0.016 | 2.43 | OK |
| Example 120 | $Fe_{85}Co_{15}$ | $Al_2O_3$ | 54 | 4907 | 0.285 | 0.905 | 0.031 | 0.013 | 2.30 | OK |

ratio of the nitrogen content to the total content of oxygen and nitrogen in the second phase (N/(N+O)) was changed. Table 10-3 shows the results.

In Examples 121 to 124, an Ar gas into which 1% nitrogen was introduced was used as the processing gas. In Examples 125 to 128, an Ar gas into which 2% nitrogen was introduced was used as the processing gas. In Examples 129 to 132 and 139 to 142, an Ar gas into which 4% nitrogen was introduced was used as the processing gas. In Examples 133 to 138, an Ar gas into which 6% nitrogen was introduced was used as the processing gas. In all Examples, the gas flow rate of the processing gas was 20 sccm (total of Ar and nitrogen).

A method of measuring N/(N+O) was as follows. At the time of sputtering of each nanogranular magnetic film, Ni foil measuring 20 mm×20 mm×50 m was prepared together with the silicon substrate having the thermal oxide film. 50 μm was the length in the thickness direction. Then, an impulse heat melting extraction method using TC600 manufactured by LECO JAPAN CORPORATION was employed to measure N/(N+O) of the nanogranular magnetic film formed on the Ni foil.

According to Table 10-3, even with the varied composition of the first phases and/or the varied compound contained in the second phase, the CV and the simple figure of merit of the nanogranular magnetic films were good. If three Comparative Examples corresponding to each Example were prepared to calculate the figure of merit, it would be highly probable that the calculated figure of merit would be 1.20 or more.

Experiment 8-4

Examples 143 to 158 were carried out as in Examples 121 to 124 except that an additional element chip containing an additional element was placed on the sputtering target similarly to Experiment 3. Further, Examples 159 to 162 were carried out as in Examples 155 to 158 except that the nitrogen concentration of the processing gas was changed to 60. Table 10-4 shows the results.

TABLE 10-3

| | Magnetic film | | | | | | | Evaluation of figure of merit | | | |
|---|---|---|---|---|---|---|---|---|---|---|---|
| | | | | | | | | | Simple | | |
| Sample No. | First phases Atomic ratio | Second phase Atomic ratio | N/(N + O) Atom % | $V_1/(V_1 + V_2)$ % | Film thickness nm | CV | Bs T | Experimental specific resistance Ωcm | benchmark specific resistance Ωcm | Simple figure of merit | OK/Not OK |
| Example 108 | $Fe_{15}Co_{85}$ | $SiO_2$ | 0 | 54 | 4865 | 0.309 | 0.821 | 0.090 | 0.040 | 2.25 | OK |
| Example 103 | $Fe_{45}Co_{55}$ | $SiO_2$ | 0 | 54 | 4739 | 0.298 | 0.848 | 0.067 | 0.028 | 2.40 | OK |
| Example 109 | $Fe_{60}Co_{40}$ | $SiO_2$ | 0 | 54 | 4697 | 0.290 | 0.895 | 0.041 | 0.015 | 2.69 | OK |
| Example 110 | $Fe_{85}Co_{15}$ | $SiO_2$ | 0 | 54 | 4722 | 0.281 | 0.907 | 0.032 | 0.013 | 2.44 | OK |
| Example 121 | $Fe_{15}Co_{85}$ | Si—O—N | 15 | 54 | 5022 | 0.312 | 0.817 | 0.088 | 0.042 | 2.08 | OK |
| Example 122 | $Fe_{45}Co_{55}$ | Si—O—N | 15 | 54 | 5065 | 0.302 | 0.842 | 0.066 | 0.030 | 2.19 | OK |
| Example 123 | $Fe_{60}Co_{40}$ | Si—O—N | 15 | 54 | 5015 | 0.294 | 0.891 | 0.039 | 0.016 | 2.43 | OK |
| Example 124 | $Fe_{85}Co_{15}$ | Si—O—N | 15 | 54 | 5004 | 0.284 | 0.903 | 0.031 | 0.014 | 2.25 | OK |
| Example 125 | $Fe_{15}Co_{85}$ | Si—O—N | 24 | 54 | 5135 | 0.319 | 0.815 | 0.084 | 0.043 | 1.93 | OK |
| Example 126 | $Fe_{45}Co_{55}$ | Si—O—N | 24 | 54 | 5094 | 0.308 | 0.840 | 0.063 | 0.031 | 2.03 | OK |
| Example 127 | $Fe_{60}Co_{40}$ | Si—O—N | 24 | 54 | 5107 | 0.301 | 0.889 | 0.037 | 0.016 | 2.25 | OK |
| Example 128 | $Fe_{85}Co_{15}$ | Si—O—N | 24 | 54 | 5147 | 0.290 | 0.900 | 0.030 | 0.014 | 2.10 | OK |
| Example 129 | $Fe_{15}Co_{85}$ | Si—O—N | 35 | 54 | 5164 | 0.324 | 0.812 | 0.081 | 0.045 | 1.79 | OK |
| Example 130 | $Fe_{45}Co_{55}$ | Si—O—N | 35 | 54 | 5120 | 0.314 | 0.836 | 0.060 | 0.033 | 1.83 | OK |
| Example 131 | $Fe_{60}Co_{40}$ | Si—O—N | 35 | 54 | 5142 | 0.305 | 0.885 | 0.036 | 0.017 | 2.08 | OK |
| Example 132 | $Fe_{85}Co_{15}$ | Si—O—N | 35 | 54 | 5158 | 0.294 | 0.895 | 0.029 | 0.015 | 1.90 | OK |
| Example 133 | $Fe_{15}Co_{85}$ | Si—O—N | 46 | 54 | 5069 | 0.334 | 0.810 | 0.078 | 0.047 | 1.67 | OK |
| Example 134 | $Fe_{45}Co_{55}$ | Si—O—N | 46 | 54 | 5026 | 0.322 | 0.833 | 0.058 | 0.034 | 1.70 | OK |
| Example 135 | $Fe_{60}Co_{40}$ | Si—O—N | 46 | 54 | 5082 | 0.312 | 0.878 | 0.036 | 0.019 | 1.91 | OK |
| Example 136 | $Fe_{85}Co_{15}$ | Si—O—N | 46 | 54 | 5027 | 0.301 | 0.892 | 0.028 | 0.016 | 1.77 | OK |
| Example 102 | $Fe_{45}Co_{55}$ | $SiO_2$ | 0 | 52 | 4826 | 0.292 | 0.821 | 0.104 | 0.040 | 2.60 | OK |
| Example 103 | $Fe_{45}Co_{55}$ | $SiO_2$ | 0 | 54 | 4739 | 0.298 | 0.848 | 0.067 | 0.028 | 2.40 | OK |
| Example 67 | $Fe_{45}Co_{55}$ | $SiO_2$ | 0 | 60 | 4906 | 0.323 | 0.951 | 0.016 | 0.0077 | 2.07 | OK |
| Example 137 | $Fe_{45}Co_{55}$ | Si—O—N | 46 | 52 | 5104 | 0.313 | 0.815 | 0.082 | 0.043 | 1.89 | OK |
| Example 134 | $Fe_{45}Co_{55}$ | Si—O—N | 46 | 54 | 5026 | 0.322 | 0.833 | 0.058 | 0.034 | 1.70 | OK |
| Example 138 | $Fe_{45}Co_{55}$ | Si—O—N | 46 | 60 | 5147 | 0.341 | 0.939 | 0.015 | 0.0089 | 1.68 | OK |
| Example 117 | $Fe_{15}Co_{85}$ | $Al_2O_3$ | 0 | 54 | 4845 | 0.314 | 0.818 | 0.085 | 0.042 | 2.04 | OK |
| Example 118 | $Fe_{45}Co_{55}$ | $Al_2O_3$ | 0 | 54 | 4865 | 0.302 | 0.847 | 0.064 | 0.028 | 2.26 | OK |
| Example 119 | $Fe_{60}Co_{40}$ | $Al_2O_3$ | 0 | 54 | 4898 | 0.295 | 0.891 | 0.039 | 0.016 | 2.43 | OK |
| Example 120 | $Fe_{85}Co_{15}$ | $Al_2O_3$ | 0 | 54 | 4907 | 0.285 | 0.905 | 0.031 | 0.013 | 2.30 | OK |
| Example 139 | $Fe_{15}Co_{85}$ | Al—O—N | 21 | 54 | 5007 | 0.322 | 0.813 | 0.082 | 0.045 | 1.83 | OK |
| Example 140 | $Fe_{45}Co_{55}$ | Al—O—N | 21 | 54 | 5074 | 0.310 | 0.838 | 0.061 | 0.032 | 1.92 | OK |
| Example 141 | $Fe_{60}Co_{40}$ | Al—O—N | 21 | 54 | 5023 | 0.303 | 0.887 | 0.036 | 0.017 | 2.14 | OK |
| Example 142 | $Fe_{85}Co_{15}$ | Al—O—N | 21 | 54 | 5008 | 0.294 | 0.898 | 0.029 | 0.015 | 1.98 | OK |

TABLE 10-4

| | Magnetic film | | | | | | | Evaluation of figure of merit | | | |
|---|---|---|---|---|---|---|---|---|---|---|---|
| Sample No. | First phases Atomic ratio | Second phase Atomic ratio | N/ (N + O) Atom % | $V_1$/ ($V_1$ + $V_2$) % | Film thick-ness nm | CV | Bs T | Experimental specific resistance Ωcm | Simple benchmark specific resistance Ωcm | Simple figure of merit | OK/ Not OK |
| Example 121 | $Fe_{15}Co_{85}$ | Si—O—N | 15 | 54 | 5022 | 0.312 | 0.817 | 0.088 | 0.042 | 2.08 | OK |
| Example 122 | $Fe_{45}Co_{55}$ | Si—O—N | 15 | 54 | 5065 | 0.302 | 0.842 | 0.066 | 0.030 | 2.19 | OK |
| Example 123 | $Fe_{60}Co_{40}$ | Si—O—N | 15 | 54 | 5015 | 0.294 | 0.891 | 0.039 | 0.016 | 2.43 | OK |
| Example 124 | $Fe_{85}Co_{15}$ | Si—O—N | 15 | 54 | 5004 | 0.284 | 0.903 | 0.031 | 0.014 | 2.25 | OK |
| Example 143 | $Fe_{15}Co_{83}Nb_2$ | Si—O—N | 15 | 54 | 4865 | 0.320 | 0.812 | 0.082 | 0.045 | 1.81 | OK |
| Example 144 | $Fe_{44}Co_{54}Nb_2$ | Si—O—N | 15 | 54 | 4877 | 0.312 | 0.834 | 0.063 | 0.034 | 1.87 | OK |
| Example 145 | $Fe_{59}Co_{39}Nb_2$ | Si—O—N | 15 | 54 | 4898 | 0.301 | 0.882 | 0.037 | 0.018 | 2.06 | OK |
| Example 146 | $Fe_{83}Co_{15}Nb_2$ | Si—O—N | 15 | 54 | 4906 | 0.292 | 0.892 | 0.030 | 0.016 | 1.90 | OK |
| Example 147 | $Fe_{15}Co_{83}Cu_2$ | Si—O—N | 15 | 54 | 4954 | 0.315 | 0.814 | 0.081 | 0.044 | 1.84 | OK |
| Example 148 | $Fe_{44}Co_{54}Cu_2$ | Si—O—N | 15 | 54 | 4967 | 0.304 | 0.838 | 0.063 | 0.032 | 1.98 | OK |
| Example 149 | $Fe_{59}Co_{39}Cu_2$ | Si—O—N | 15 | 54 | 4923 | 0.298 | 0.887 | 0.036 | 0.017 | 2.14 | OK |
| Example 150 | $Fe_{83}Co_{15}Cu_2$ | Si—O—N | 15 | 54 | 4898 | 0.288 | 0.899 | 0.029 | 0.014 | 2.00 | OK |
| Example 151 | $Fe_{15}Co_{83}P_2$ | Si—O—N | 15 | 54 | 4883 | 0.313 | 0.812 | 0.086 | 0.045 | 1.90 | OK |
| Example 152 | $Fe_{44}Co_{54}P_2$ | Si—O—N | 15 | 54 | 4892 | 0.302 | 0.834 | 0.065 | 0.034 | 1.93 | OK |
| Example 153 | $Fe_{59}Co_{39}P_2$ | Si—O—N | 15 | 54 | 4856 | 0.295 | 0.882 | 0.038 | 0.018 | 2.12 | OK |
| Example 154 | $Fe_{83}Co_{15}P_2$ | Si—O—N | 15 | 54 | 4814 | 0.286 | 0.894 | 0.030 | 0.015 | 1.94 | OK |
| Example 155 | $Fe_{15}Co_{83}Ni_2$ | Si—O—N | 15 | 54 | 4932 | 0.315 | 0.815 | 0.082 | 0.043 | 1.89 | OK |
| Example 156 | $Fe_{44}Co_{54}Ni_2$ | Si—O—N | 15 | 54 | 4970 | 0.306 | 0.839 | 0.064 | 0.031 | 2.04 | OK |
| Example 157 | $Fe_{59}Co_{39}Ni_2$ | Si—O—N | 15 | 54 | 4917 | 0.297 | 0.888 | 0.037 | 0.017 | 2.22 | OK |
| Example 158 | $Fe_{83}Co_{15}Ni_2$ | Si—O—N | 15 | 54 | 4931 | 0.286 | 0.901 | 0.030 | 0.014 | 2.12 | OK |
| Example 159 | $Fe_{15}Co_{83}Ni_2$ | Si—O—N | 45 | 54 | 5024 | 0.324 | 0.808 | 0.080 | 0.048 | 1.67 | OK |
| Example 160 | $Fe_{44}Co_{54}Ni_2$ | Si—O—N | 45 | 54 | 5035 | 0.314 | 0.831 | 0.061 | 0.035 | 1.74 | OK |
| Example 161 | $Fe_{59}Co_{39}Ni_2$ | Si—O—N | 45 | 54 | 5104 | 0.305 | 0.879 | 0.035 | 0.019 | 1.88 | OK |
| Example 162 | $Fe_{83}Co_{15}Ni_2$ | Si—O—N | 45 | 54 | 5166 | 0.294 | 0.892 | 0.029 | 0.016 | 1.83 | OK |

According to Table 10-4, even with the varied composition of the first phases and/or the varied compound contained in the second phase, the CV and the simple figure of merit of the nanogranular magnetic films were good. If three Comparative Examples corresponding to each Example were prepared to calculate the figure of merit, it would be highly probable that the calculated figure of merit would be 1.20 or more.

Experiment 8-5

Examples 163 to 170 were carried out as in Examples 155 to 158 except that the ratio of Fe to Co in the first phases was changed. Examples 171 to 174 were carried out as in Examples 155 to 158 except that the number of additional element chips was changed. Further, Examples 175 to 184 were carried out as in Example 156 except that the additional element was changed. Table 10-5 shows the results.

TABLE 10-5

| | Magnetic film | | | | | | | Evaluation of figure of merit | | | |
|---|---|---|---|---|---|---|---|---|---|---|---|
| Sample No. | First phases Atomic ratio | Second phase Atomic ratio | N/ (N + O) Atom % | $V_1$/ ($V_1$ + $V_2$) % | Film thick-ness nm | CV | Bs T | Experimental specific resistance Ωcm | Simple benchmark specific resistance Ωcm | Simple figure of merit | OK/ Not OK |
| Example 163 | $Fe_{15}Co_{83}Ni_2$ | Si—O—N | 15 | 52 | 5176 | 0.308 | 0.803 | 0.120 | 0.051 | 2.34 | OK |
| Example 164 | $Fe_{44}Co_{54}Ni_2$ | Si—O—N | 15 | 52 | 5202 | 0.297 | 0.829 | 0.088 | 0.036 | 2.45 | OK |
| Example 165 | $Fe_{59}Co_{39}Ni_2$ | Si—O—N | 15 | 52 | 5169 | 0.290 | 0.870 | 0.056 | 0.021 | 2.68 | OK |
| Example 166 | $Fe_{83}Co_{15}Ni_2$ | Si—O—N | 15 | 52 | 5194 | 0.279 | 0.881 | 0.045 | 0.018 | 2.47 | OK |
| Example 155 | $Fe_{15}Co_{83}Ni_2$ | Si—O—N | 15 | 54 | 4932 | 0.315 | 0.815 | 0.082 | 0.043 | 1.89 | OK |
| Example 156 | $Fe_{44}Co_{54}Ni_2$ | Si—O—N | 15 | 54 | 4970 | 0.306 | 0.839 | 0.064 | 0.031 | 2.04 | OK |
| Example 157 | $Fe_{59}Co_{39}Ni_2$ | Si—O—N | 15 | 54 | 4917 | 0.297 | 0.888 | 0.037 | 0.017 | 2.22 | OK |
| Example 158 | $Fe_{83}Co_{15}Ni_2$ | Si—O—N | 15 | 54 | 4931 | 0.286 | 0.901 | 0.030 | 0.014 | 2.12 | OK |
| Example 167 | $Fe_{15}Co_{83}Ni_2$ | Si—O—N | 15 | 60 | 5046 | 0.340 | 0.890 | 0.027 | 0.016 | 1.66 | OK |
| Example 168 | $Fe_{44}Co_{54}Ni_2$ | Si—O—N | 15 | 60 | 5083 | 0.323 | 0.922 | 0.019 | 0.011 | 1.74 | OK |
| Example 169 | $Fe_{59}Co_{39}Ni_2$ | Si—O—N | 15 | 60 | 5037 | 0.315 | 0.964 | 0.013 | 0.0066 | 2.02 | OK |
| Example 170 | $Fe_{83}Co_{15}Ni_2$ | Si—O—N | 15 | 60 | 5020 | 0.307 | 0.971 | 0.011 | 0.0061 | 1.83 | OK |
| Example 171 | $Fe_{14}Co_{81}Ni_5$ | Si—O—N | 15 | 54 | 4826 | 0.326 | 0.807 | 0.077 | 0.049 | 1.58 | OK |
| Example 172 | $Fe_{43}Co_{52}Ni_5$ | Si—O—N | 15 | 54 | 4795 | 0.317 | 0.829 | 0.061 | 0.036 | 1.70 | OK |
| Example 173 | $Fe_{57}Co_{38}Ni_5$ | Si—O—N | 15 | 54 | 4802 | 0.306 | 0.878 | 0.034 | 0.019 | 1.80 | OK |
| Example 174 | $Fe_{81}Co_{14}Ni_5$ | Si—O—N | 15 | 54 | 4818 | 0.295 | 0.890 | 0.028 | 0.016 | 1.73 | OK |
| Example 175 | $Fe_{44}Co_{54}Mo_2$ | Si—O—N | 15 | 54 | 4923 | 0.307 | 0.828 | 0.064 | 0.036 | 1.76 | OK |
| Example 176 | $Fe_{44}Co_{54}Ti_2$ | Si—O—N | 15 | 54 | 4874 | 0.306 | 0.839 | 0.061 | 0.031 | 1.95 | OK |
| Example 177 | $Fe_{44}Co_{54}Zr_2$ | Si—O—N | 15 | 54 | 4864 | 0.306 | 0.830 | 0.063 | 0.035 | 1.77 | OK |
| Example 178 | $Fe_{44}Co_{54}Cr_2$ | Si—O—N | 15 | 54 | 4912 | 0.308 | 0.836 | 0.064 | 0.033 | 1.96 | OK |

TABLE 10-5-continued

| Sample No. | Magnetic film: First phases Atomic ratio | Second phase Atomic ratio | N/(N + O) Atom % | $V_1/(V_1+V_2)$ % | Film thickness nm | CV | Bs T | Evaluation of figure of merit: Experimental specific resistance Ωcm | Simple benchmark specific resistance Ωcm | Simple figure of merit | OK/Not OK |
|---|---|---|---|---|---|---|---|---|---|---|---|
| Example 179 | $Fe_{44}Co_{54}Mn_2$ | Si—O—N | 15 | 54 | 4965 | 0.305 | 0.832 | 0.063 | 0.035 | 1.82 | OK |
| Example 180 | $Fe_{44}Co_{54}B_2$ | Si—O—N | 15 | 54 | 5034 | 0.298 | 0.837 | 0.067 | 0.032 | 2.08 | OK |
| Example 181 | $Fe_{44}Co_{54}C_2$ | Si—O—N | 15 | 54 | 5078 | 0.294 | 0.833 | 0.067 | 0.034 | 1.96 | OK |
| Example 182 | $Fe_{44}Co_{54}V_2$ | Si—O—N | 15 | 54 | 5019 | 0.309 | 0.835 | 0.066 | 0.033 | 1.98 | OK |
| Example 183 | $Fe_{44}Co_{54}W_2$ | Si—O—N | 15 | 54 | 4912 | 0.308 | 0.835 | 0.063 | 0.033 | 1.91 | OK |
| Example 184 | $Fe_{44}Co_{54}Al_2$ | Si—O—N | 15 | 54 | 4864 | 0.302 | 0.832 | 0.062 | 0.035 | 1.79 | OK |

According to Table 10-5, even with the varied composition of the first phases, the CV and the simple figure of merit of the nanogranular magnetic films were good. If three Comparative Examples corresponding to $V_1/(V_1+V_2)$ of each Example were prepared to calculate the figure of merit, it would be highly probable that the calculated figure of merit would be 1.20 or more.

Experiment 9

Experiment 9 was conducted as in Examples 3, 103, and 134 except that the film thickness was greatly changed. In Experiment 9, the simple figure of merit was calculated on the supposition that, even if the film thickness was greatly different from 5,000 nm, the film thickness was about 5,000 nm. Table 11 shows the results.

According to Table 11, even with the greatly varied film thickness, the CV and the simple figure of merit of the nanogranular magnetic films were good. If three Comparative Examples corresponding to the film thickness of each Example were prepared to calculate the figure of merit, it would be highly probable that the calculated figure of merit would be 1.20 or more.

According to the above Examples and the like, the smaller the amount of the additional element added, the more readily both Bs and specific resistance were absolutely increased. In terms of absolutely increasing both Bs and specific resistance, the figure of merit calculated using $y=0.0044\times x^{-11.25}$, which was the formula for the performance curve derived from Comparative Examples 2 to 4 not containing an additional element, was more preferably 1.20 or more.

REFERENCE NUMERALS

1 . . . nanogranular magnetic film
11 . . . first phase

TABLE 11

| Sample No. | Pre-processing: UV/$O_3$ | Pre-processing: Reverse sputtering | Film formation conditions: Rotation speed rpm | Continuous film formation time s | Continuously formed film thickness nm | Magnetic film: First phases Atomic ratio | Second phase Atomic ratio | N/(N + O) Atom % | $V_1/(V_1+V_2)$ % | Film thickness nm | CV | Bs T | Evaluation of figure of merit: Experimental specific resistance Ωcm | Simple benchmark specific resistance Ωcm | Simple figure of merit | OK/Not OK |
|---|---|---|---|---|---|---|---|---|---|---|---|---|---|---|---|---|
| Example 69 | Yes | Yes | 12 | 1.7 | 1.0 | $Fe_{45}Co_{55}$ | $SiO_2$ | 0 | 46 | 299 | 0.273 | 0.668 | 1.13 | 0.40 | 2.80 | OK |
| Example 3 | Yes | Yes | 12 | 1.7 | 1.0 | $Fe_{45}Co_{55}$ | $SiO_2$ | 0 | 46 | 4,876 | 0.275 | 0.667 | 1.16 | 0.41 | 2.83 | OK |
| Example 70 | Yes | Yes | 12 | 1.7 | 1.0 | $Fe_{45}Co_{55}$ | $SiO_2$ | 0 | 46 | 20,462 | 0.285 | 0.661 | 1.18 | 0.45 | 2.60 | OK |
| Example 71 | Yes | Yes | 12 | 1.7 | 1.0 | $Fe_{45}Co_{55}$ | $SiO_2$ | 0 | 46 | 101,293 | 0.296 | 0.653 | 1.21 | 0.52 | 2.32 | OK |
| Example 185 | Yes | Yes | 12 | 1.7 | 1.0 | $Fe_{45}Co_{55}$ | $SiO_2$ | 0 | 54 | 277 | 0.297 | 0.847 | 0.065 | 0.028 | 2.30 | OK |
| Example 103 | Yes | Yes | 12 | 1.7 | 1.0 | $Fe_{45}Co_{55}$ | $SiO_2$ | 0 | 54 | 4,739 | 0.298 | 0.848 | 0.067 | 0.028 | 2.40 | OK |
| Example 186 | Yes | Yes | 12 | 1.7 | 1.0 | $Fe_{45}Co_{55}$ | $SiO_2$ | 0 | 54 | 25,763 | 0.305 | 0.840 | 0.068 | 0.031 | 2.19 | OK |
| Example 187 | Yes | Yes | 12 | 1.7 | 1.0 | $Fe_{45}Co_{55}$ | SiON | 45 | 54 | 283 | 0.318 | 0.831 | 0.057 | 0.035 | 1.63 | OK |
| Example 134 | Yes | Yes | 12 | 1.7 | 1.0 | $Fe_{45}Co_{55}$ | SiON | 45 | 54 | 5,026 | 0.322 | 0.833 | 0.058 | 0.034 | 1.70 | OK |
| Example 188 | Yes | Yes | 12 | 1.7 | 1.0 | $Fe_{45}Co_{55}$ | SiON | 45 | 54 | 25,238 | 0.329 | 0.835 | 0.056 | 0.033 | 1.69 | OK |

12 . . . second phase
111 . . . rotation member
111*a* . . . rotation plate
111*b* . . . rotation axis
113 . . . substrate
121 . . . sputtering apparatus
123 . . . sputtering target
131 . . . shutter

What is claimed is:

1. A nanogranular magnetic film comprising:

first phases comprised of nano-domains dispersed in a second phase, wherein the first phases comprise Fe and Co;

the second phase comprises at least one selected from the group consisting of O, N, and F; and a CV of Fe/(Fe+Co) of grids is 0.150 or more and 0.500 or less, provided that a measurement range is determined in the nanogranular magnetic film, the measurement range is divided with the grids comprising at least 80,000 grids each measuring 1 nm×1 nm×1 nm, and Fe/(Fe+Co) of each of the grids is measured in atomic ratio.

2. The nanogranular magnetic film according to claim 1, wherein a volume ratio of a volume of the first phases to a total volume of the first phases and the second phase is 40% or more and 65% or less.

3. The nanogranular magnetic film according to claim 1, wherein Fe/(Fe+Co) of the grids averages 0.15 or more and 0.85 or less.

4. An electronic component comprising the nanogranular magnetic film according to claim 1.

* * * * *